US006473032B1

(12) United States Patent
Trimble

(10) Patent No.: US 6,473,032 B1
(45) Date of Patent: Oct. 29, 2002

(54) NETWORK OF NON-COOPERATIVE INTEGRATED PSEUDOLITE/SATELLITE BASE STATION TRANSMITTERS

(75) Inventor: Charles R. Trimble, Sunnyvale, CA (US)

(73) Assignee: Trimble Navigation, Ltd, Sunnyvale, CA (US)

( * ) Notice: Subject to any disclaimer, the term of this patent is extended or adjusted under 35 U.S.C. 154(b) by 22 days.

(21) Appl. No.: 09/812,007

(22) Filed: Mar. 18, 2001

(51) Int. Cl.$^7$ ............................................. H04B 7/185
(52) U.S. Cl. ............................ 342/357.14; 342/357.09
(58) Field of Search ....................... 342/357.06, 357.09, 342/357.14, 463

(56) References Cited

U.S. PATENT DOCUMENTS

| | | | | |
|---|---|---|---|---|
| 5,646,630 A | * | 7/1997 | Sheynblat et al. | 342/357 |
| 5,786,773 A | * | 7/1998 | Murphy | 340/947 |
| 5,999,124 A | * | 12/1999 | Sheynblat | 342/357.09 |
| 6,198,432 B1 | | 3/2001 | Janky | |
| 6,201,497 B1 | * | 3/2001 | Snyder et al. | 342/357.06 |

* cited by examiner

*Primary Examiner*—Dao Phan
(74) *Attorney, Agent, or Firm*—Boris G. Tankhilevich

(57) ABSTRACT

A network of non-cooperative integrated pseudolite (PL)/satellite base station (SBS) transmitters covering an open area. The network comprises a first plurality (K) of integrated pseudolite/satellite base station $(PL)_1/(SBS)$ transmitters, located in an open area A, and a second plurality (M) of non-cooperative integrated $PL_2/SBS$ transmitters, located in an open area B. K and M are integers. Each PL transmitter is co-located with one SBS. Each SBS provides a satellite timing synchronization signal. Each integrated active (transmitting) PL/SBS transmitter transmits its position location as a part of its message. The first plurality (K) of integrated $PL_1/SBS$ transmitters includes a substantially sufficient number of active integrated $PL_1/SBS$ transmitters in order to fill out satellite shades of coverage and to substantially cover the area A. Each integrated $PL_2/SBS$ transmitter continuously detects a plurality of ranging signals transmitted by each active integrated $PL_1/SBS$ transmitter. Each integrated $PL_2/SBS$ transmitter includes a processor including an algorithm comprising at least the following logic: each integrated $PL_2/SBS$ transmitter does not transmit if the plurality of active integrated $PL_1/SBS$ transmitters substantially covers the area B; and at least a plurality sub-of integrated $PL_2/SBS$ transmitters starts transmitting, if a plurality of integrated $PL_1/SBS$ transmitters does not substantially cover the open area B.

35 Claims, 8 Drawing Sheets

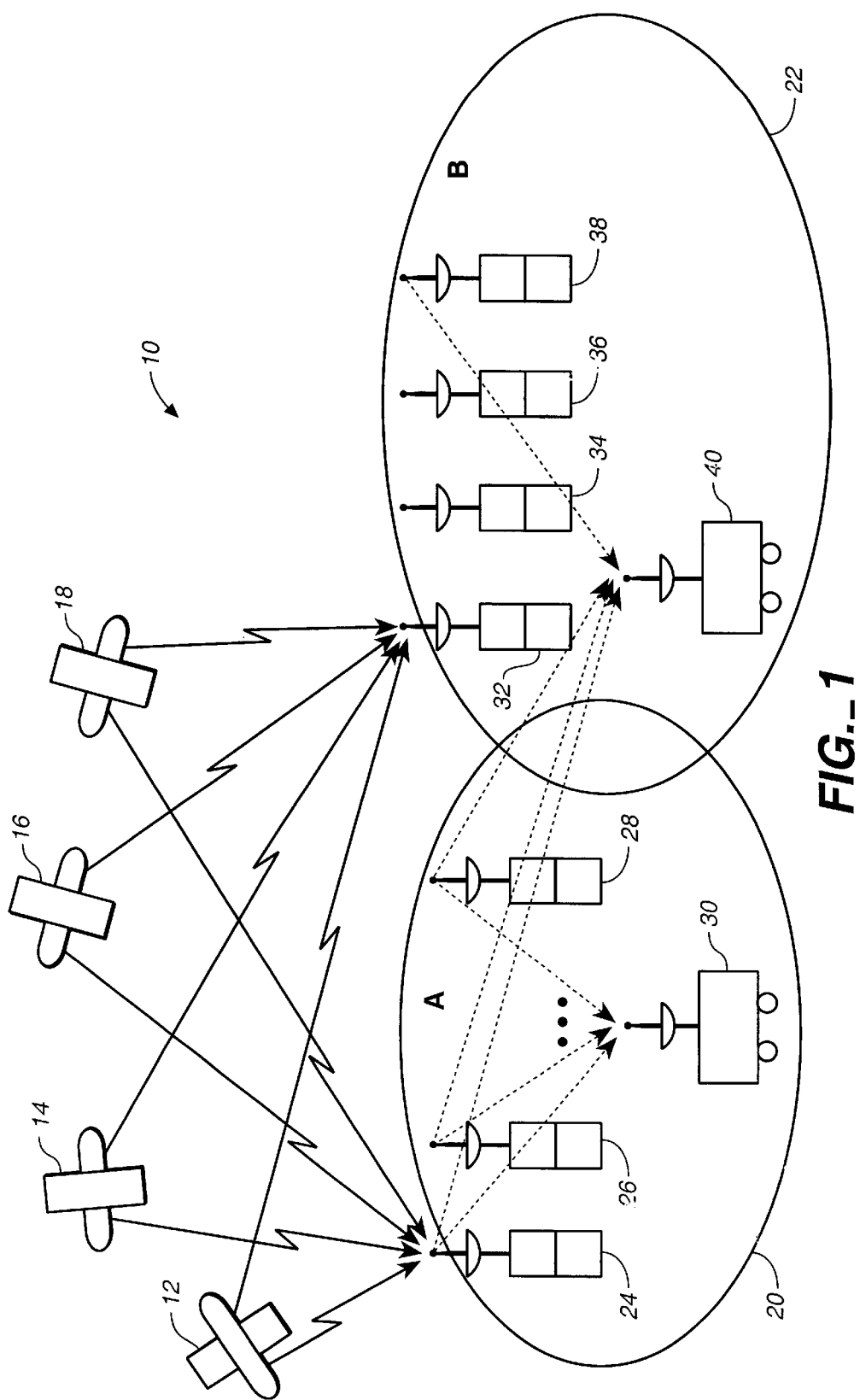
FIG._1

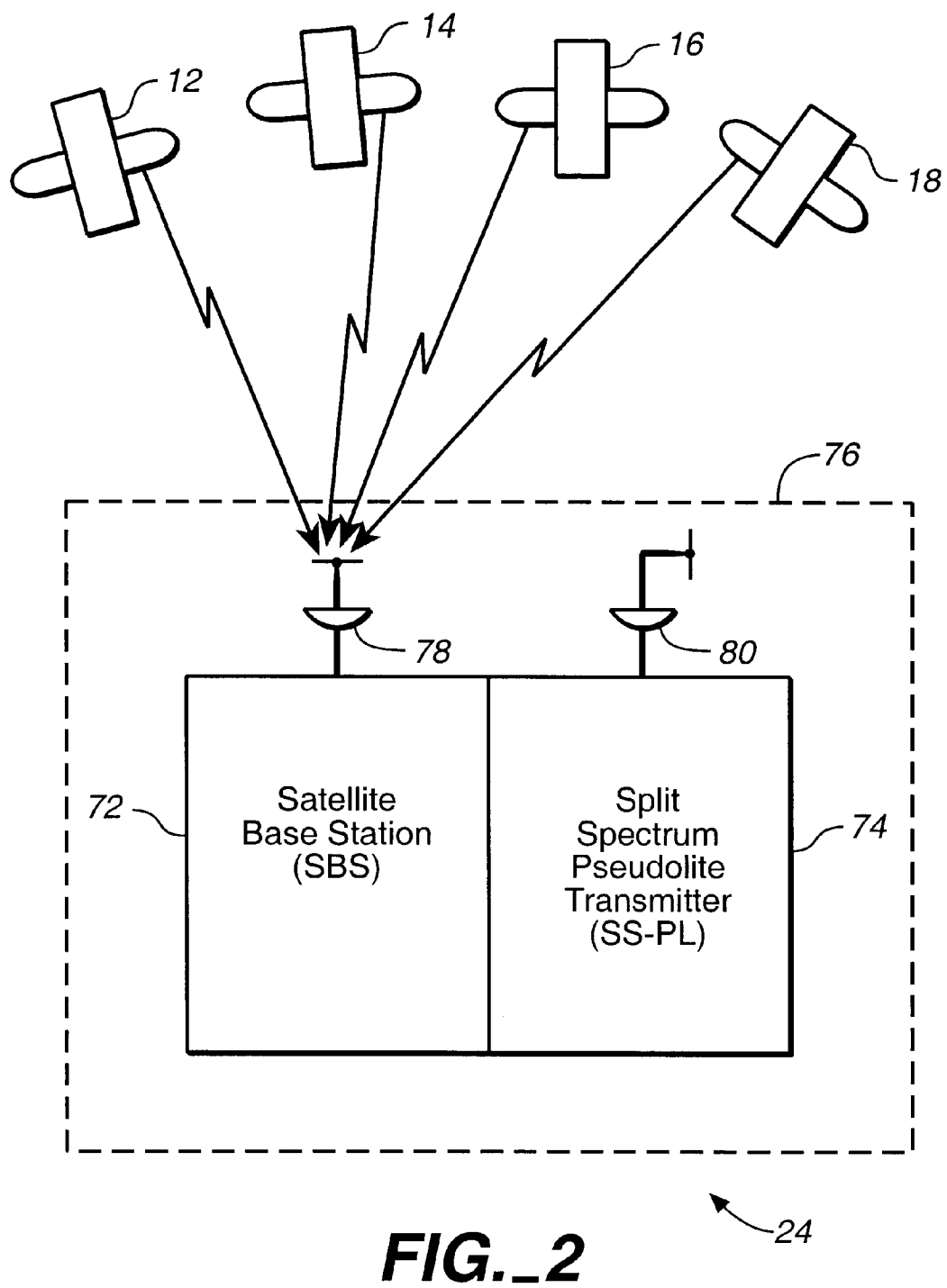
FIG._2

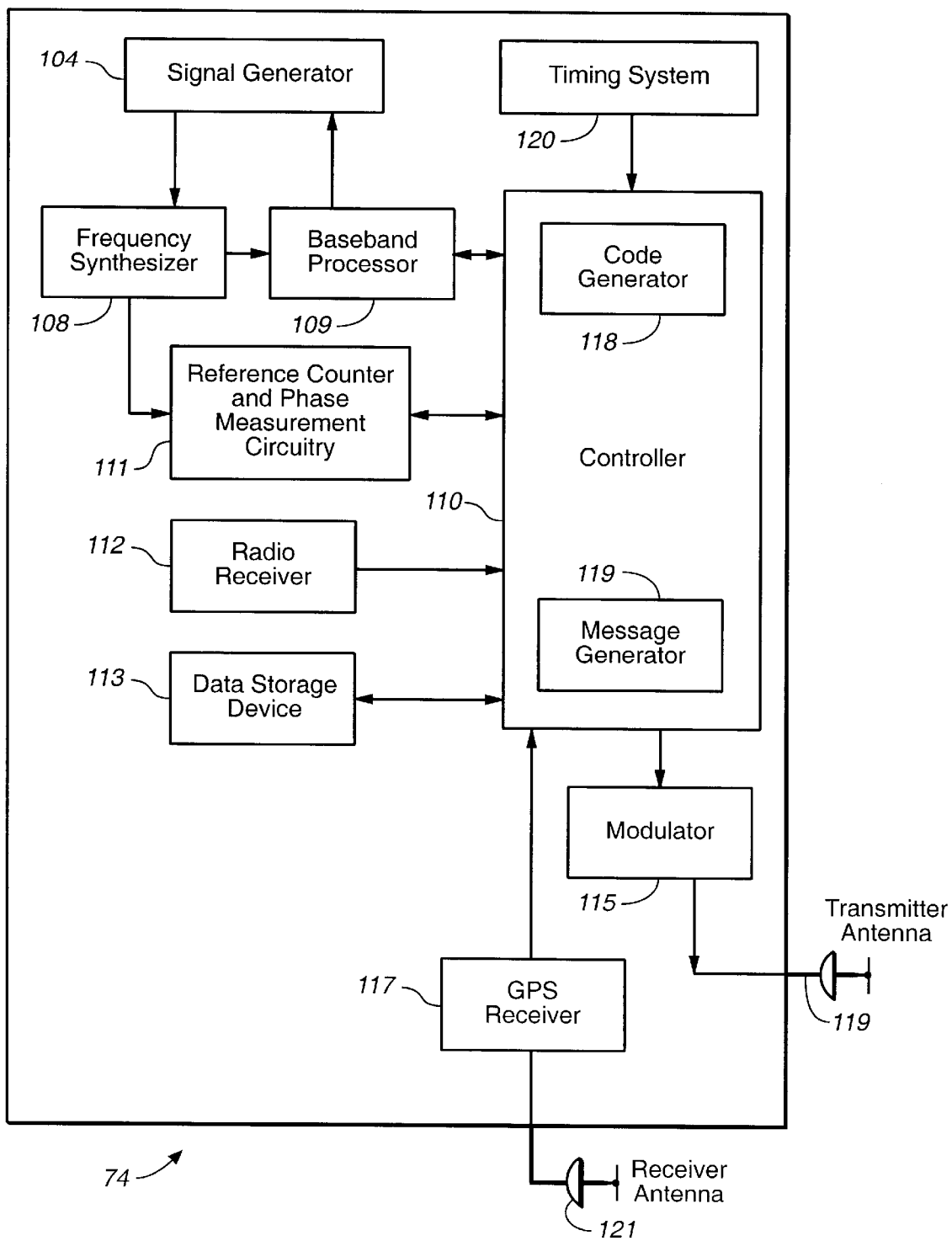
FIG._3

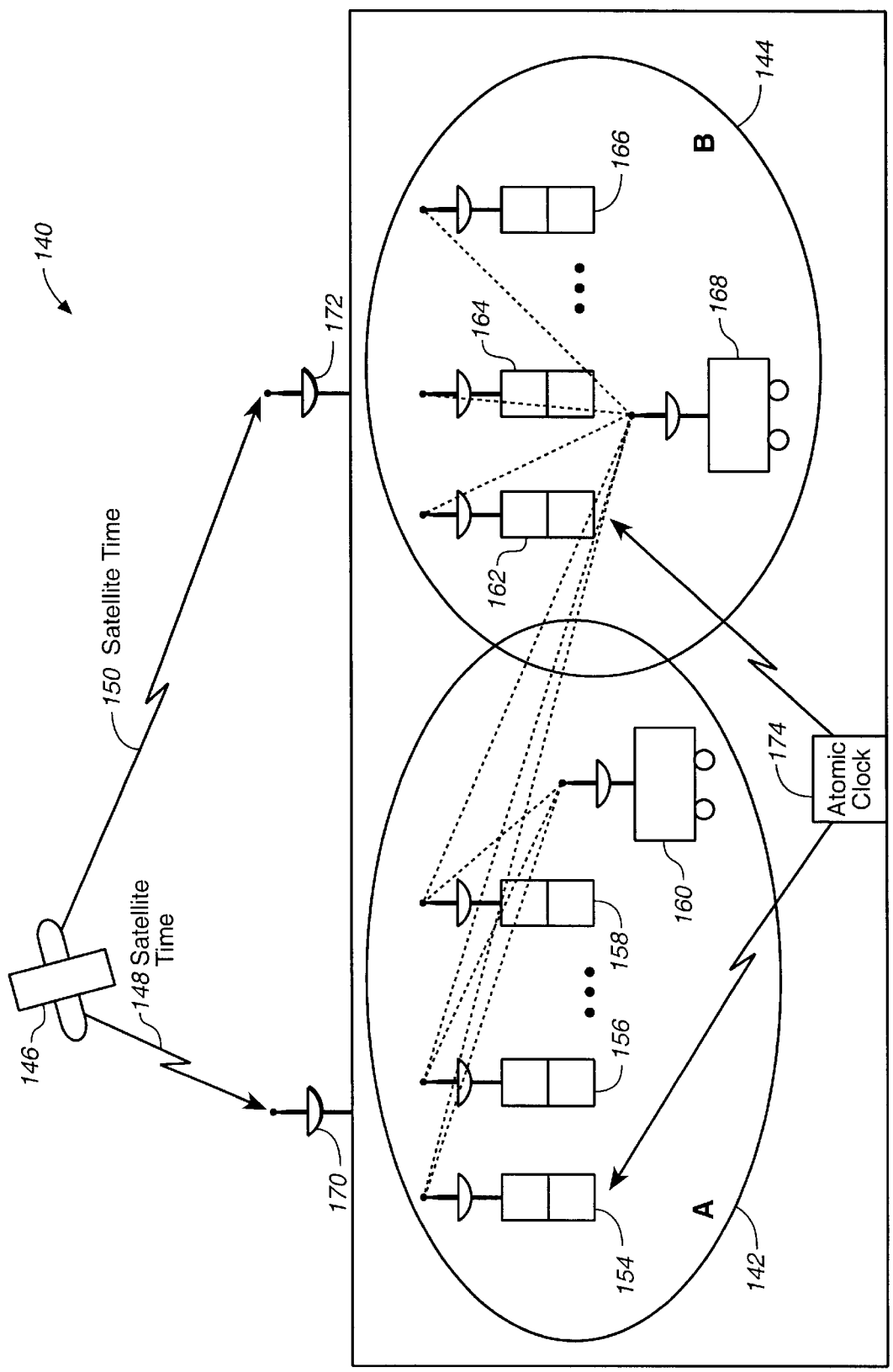
FIG._4

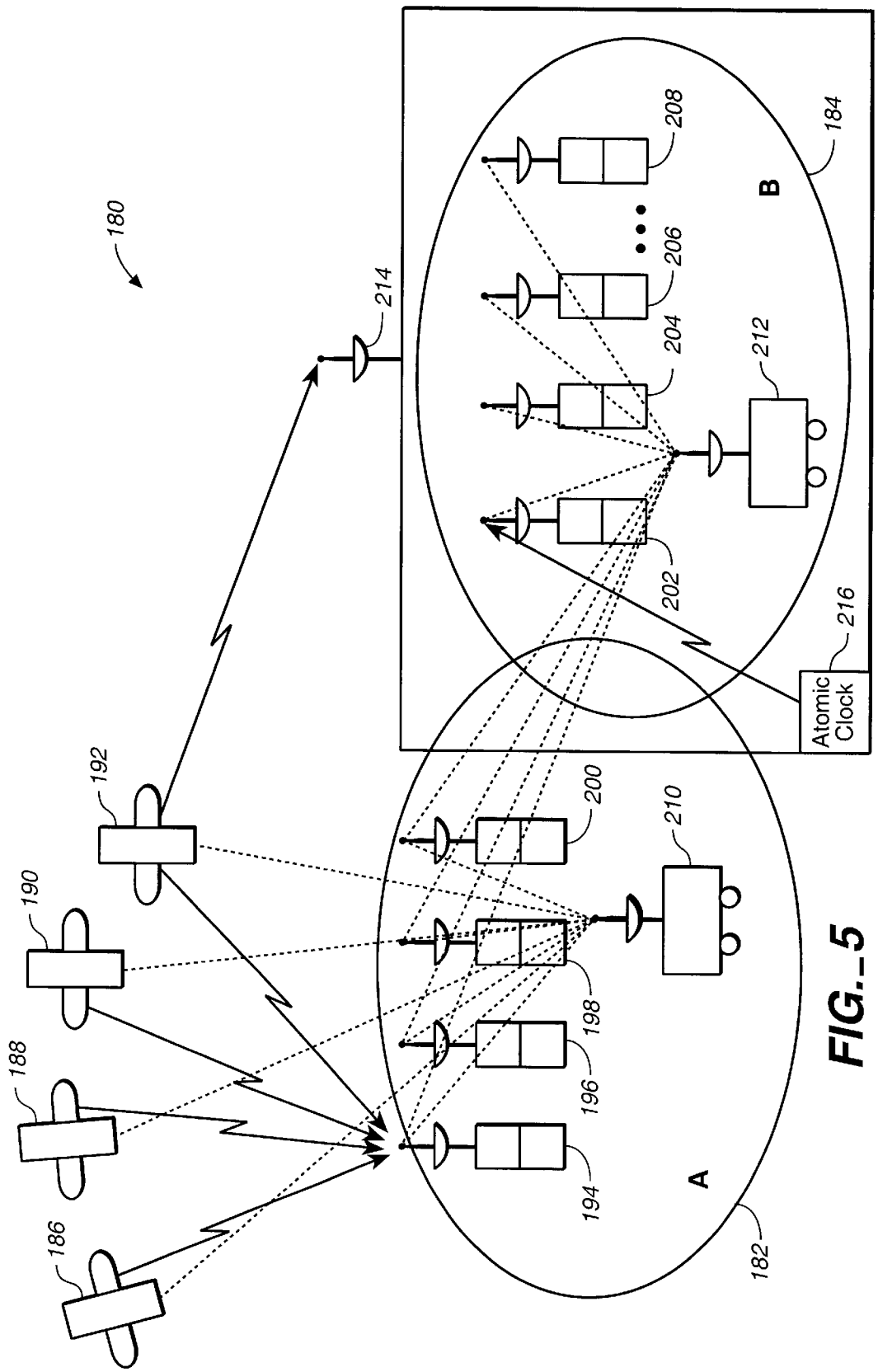
FIG._5

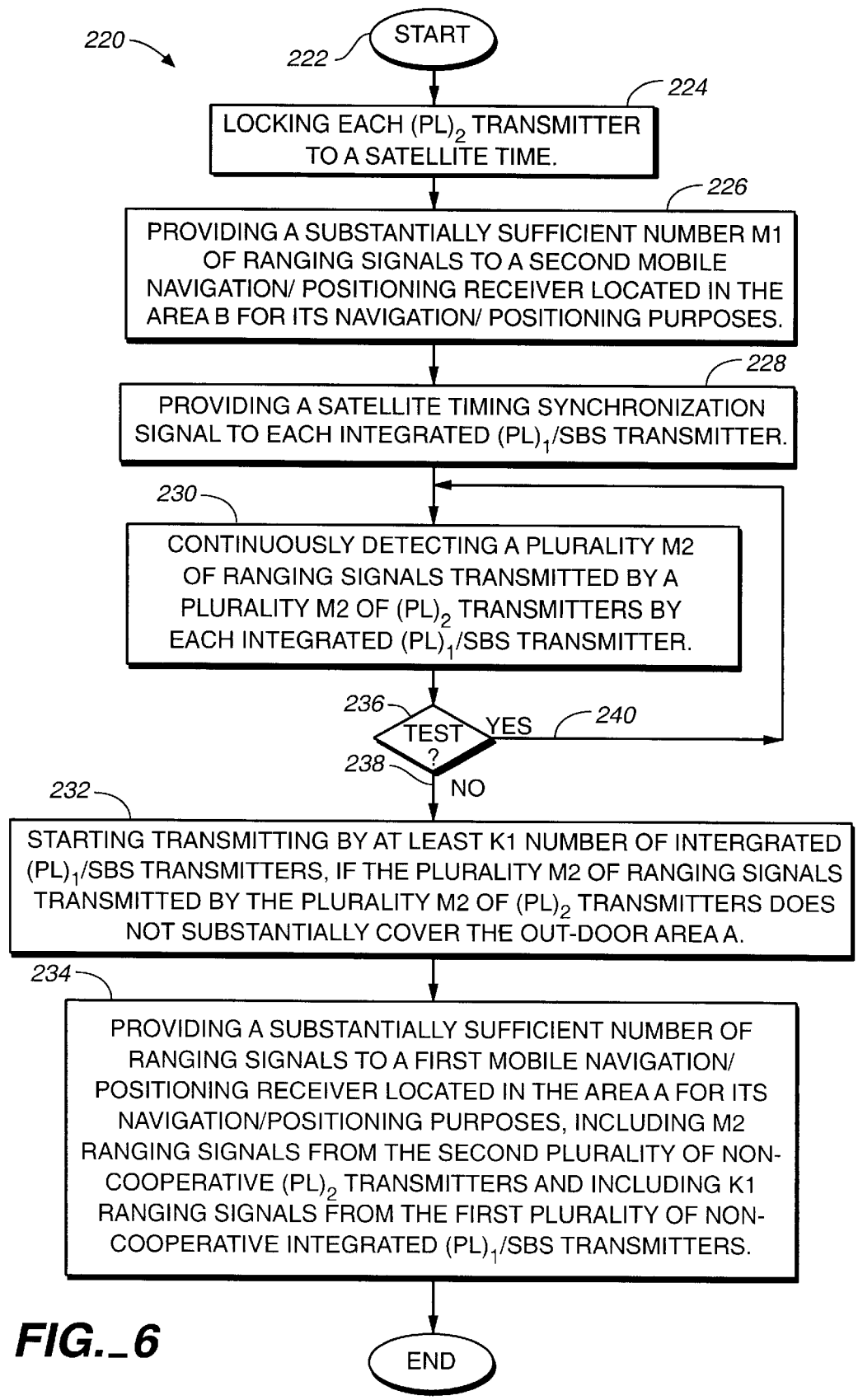
FIG._6

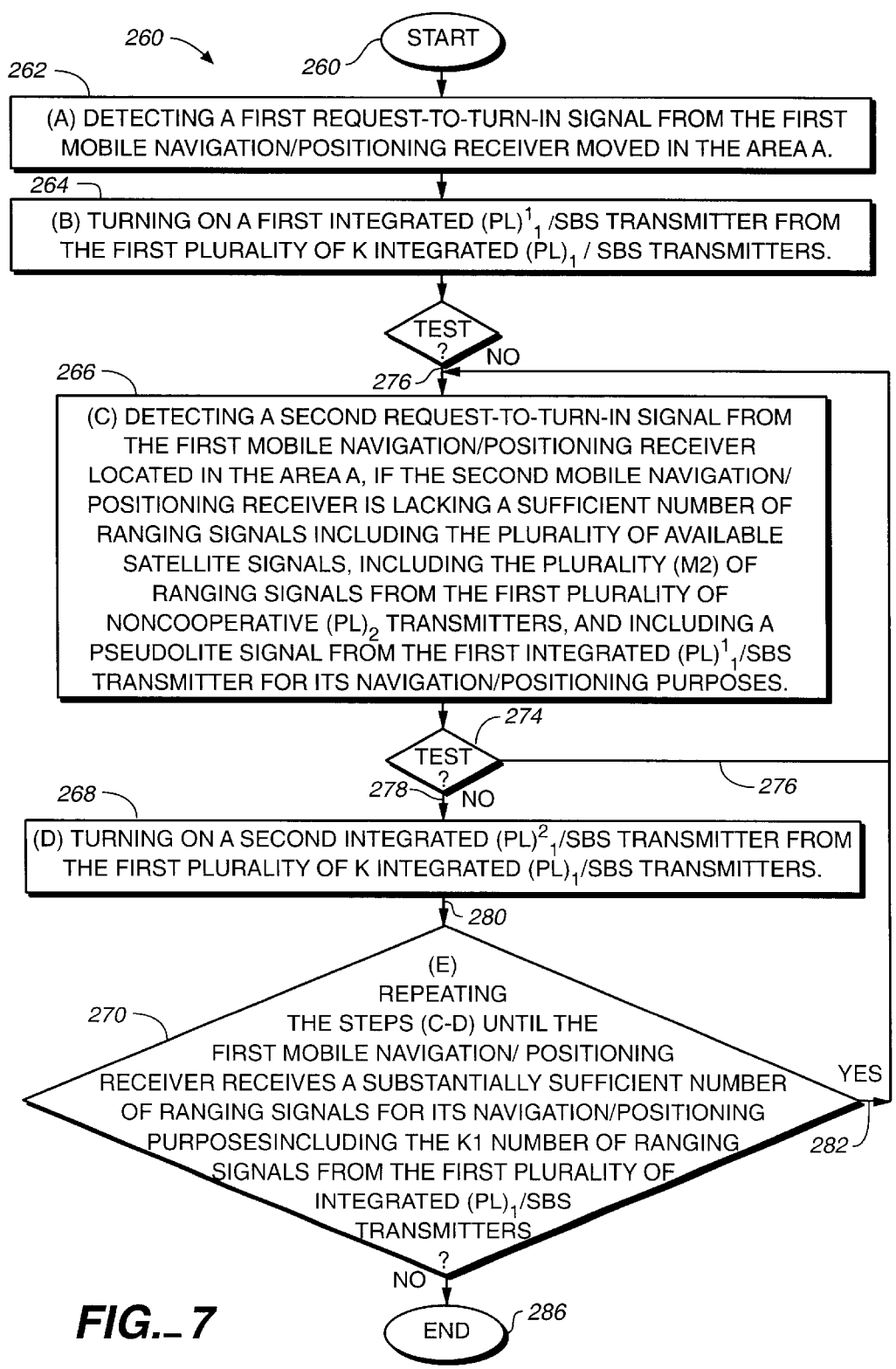
FIG._7

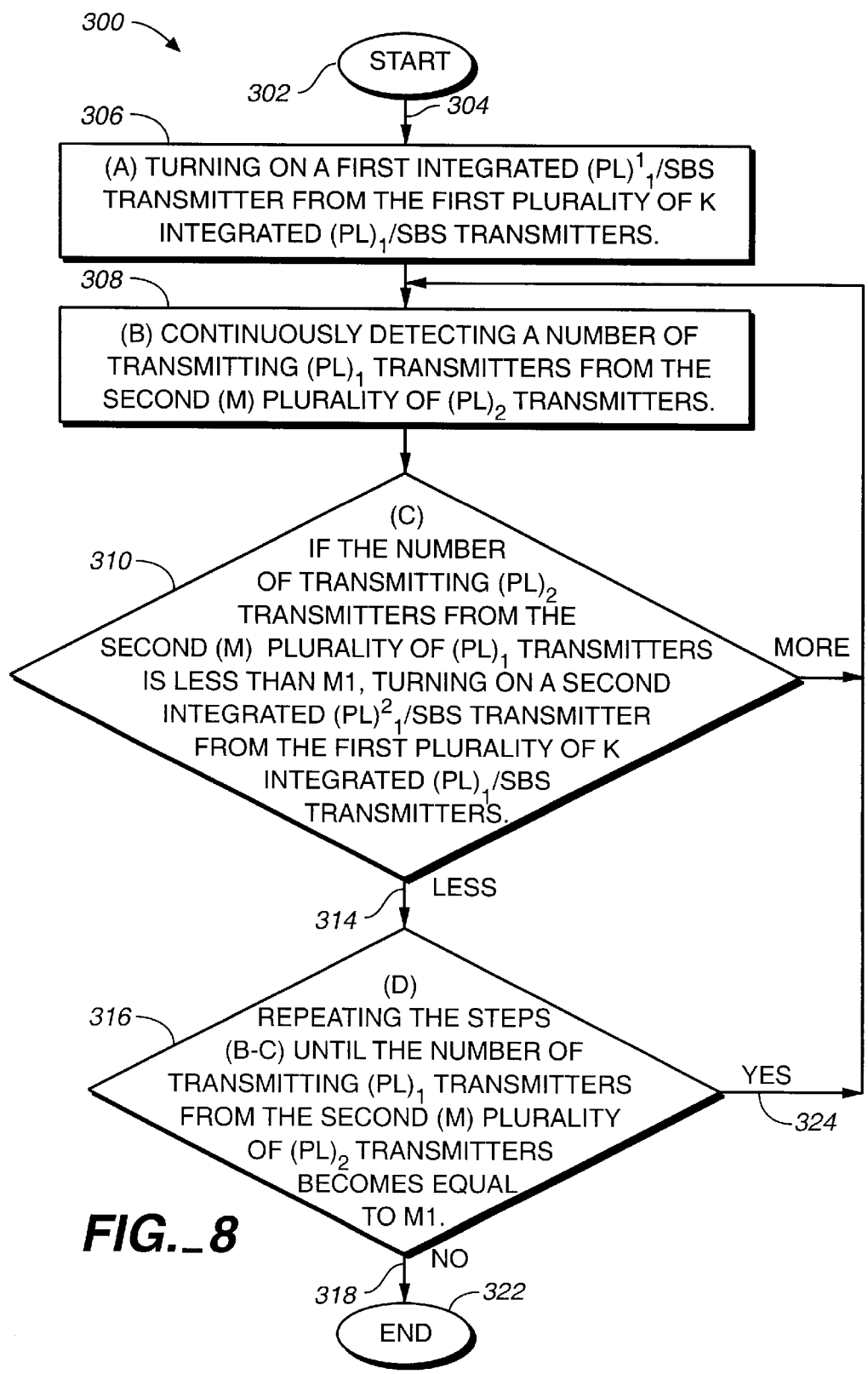
FIG._8

NETWORK OF NON-COOPERATIVE INTEGRATED PSEUDOLITE/SATELLITE BASE STATION TRANSMITTERS

BACKGROUND OF THE INVENTION

1. Field of the Invention

The present invention relates to pseudolite transmitters, or more specifically, to network of non-cooperative integrated pseudolite/satellite base station transmitters.

2. Discussion of the Prior Art

The Global Positioning System (GPS) is a system of satellite signal transmitters that transmits information from which an observer's present location and/or the time of observation can be determined. Another satellite-based navigation system is called the Global Orbiting Navigational System (GLONASS), which can operate as an alternative or supplemental system.

The GPS was developed by the United States Department of Defense (DOD) under its NAVSTAR satellite program. A fully operational GPS includes more than 21 Earth orbiting satellites approximately uniformly dispersed around six circular orbits with four satellites each, the orbits being inclined at an angle of 55° relative to the equator and being separated from each other by multiples of 60° longitude. The orbits have radii of 26,560 kilometers and are approximately circular. The orbits are non-geosynchronous, with 0.5 sidereal day (11.967 hours) orbital time intervals, so that the satellites move with time relative to the Earth below. Generally, four or more GPS satellites will be visible from most points on the Earth's surface, and can be used to determine an observer's position anywhere on the Earth's surface, 24 hours per day. Each satellite carries a cesium or rubidium atomic clock to provide timing information for the signals transmitted by the satellites. An internal clock correction is provided for each satellite clock.

Each GPS satellite continuously transmits two spread spectrum, L-band carrier signals: an L1 signal having a frequency f1=1575.42 MHz (nineteen centimeter carrier wavelength) and an L2 signal having a frequency f2=1227.6 MHz (twenty-four centimeter carrier wavelength). GPS satellites transmit both a C/A code and a P-code. There are a total of 32 pseudo random (PRN) C/A codes, with each satellite generating a different C/A code. The code modulations that produce either a P-code or a C/A code are impressed onto the L1 carrier and the L2 carrier.

The deployment of additional frequencies is being planned by the DOD. More specifically, DOD is exploring several options to maintain, or improve, the performance of civilian applications of GPS without compromising military utilities. Indeed, the civilian community does not have a second frequency. Today, corrections are based upon L2, which is a military frequency, and subject to DOD use and control. The addition of L5 to the GPS constellation on the Block IIF satellites would, at a minimum, assure the civilian community of the existence of reliable dual frequency transmissions.

As a result, a new GPS frequency, L5, is being considered for civil sector uses in order to reserve L2 for military purposes. This new frequency is targeted to provide both carrier phase and C/A-code range information. Two frequencies are proposed for L5; the first being 1207 MHz yielding a 368 MHz separation from L1, and the second being 1309 MHz having a separation of 266 MHz from L1.

The GPS satellite bit stream includes navigational information on the ephemeris of the transmitting GPS satellite (which includes orbital information about the transmitting satellite within next several hours of transmission) and an almanac for all GPS satellites (which includes a less detailed orbital information about all other satellites). The transmitted satellite information also includes parameters providing corrections for ionospheric signal propagation delays (suitable for single frequency receivers) and for an offset time between satellite clock time and true GPS time. The navigational information is transmitted at a rate of 50 Baud.

A second satellite-based navigation system is the Global Orbiting Navigation Satellite System (GLONASS), placed in orbit by the former Soviet Union and now maintained by the Russian Republic. GLONASS uses 24 satellites, distributed approximately uniformly in three orbital planes of eight satellites each. Each orbital plane has a nominal inclination of 64.8° relative to the equator, and the three orbital planes are separated from each other by multiples of 120° longitude. The GLONASS satellites have circular orbits with a radii of about 25,510 kilometers and a satellite period of revolution of $8/17$ of a sidereal day (11.26 hours). A GLONASS satellite and a GPS satellite will thus complete 17 and 16 revolutions, respectively, around the Earth every 8 days. The GLONASS system uses two carrier signals L1 and L2 with frequencies of $f1=(1.602+9 k/16)$ GHz and $f2=(1.246+7k/16)$ GHz, where k ($=1,2 \ldots 24$) is the channel or satellite number. These frequencies lie in two bands at 1.597–1.617 GHz (L1) and 1,240–1,260 GHz (L2). The L1 code is modulated by a C/A-code (chip rate=0.511 MHz) and by a P-code (chip rate=5.11 MHz). The L2 code is presently modulated only by the P-code. The GLONASS satellites also transmit navigational data at a rate of 50 Baud. Because the channel frequencies are distinguishable from each other, the P-code is the same, and the C/A-code is the same, for each satellite. The methods for receiving and demodulating the GLONASS signals are similar to the methods used for the GPS signals.

The European Union plans to develop by 2008 the system of navigation and positioning by satellite designed exclusively for civil purposes—the GALILEO system. GALILEO should enable each individual, by way of a small, cheap individual receiver, to know his or her position to within a few meters, with guaranteed continuity of transmission of the signal. The GALILEO project, supported by the European Space Agency, aims to launch a series satellites at around 20 000 km to be monitored by a network of ground control stations, in order to provide world cover. GALILEO system should be integrated into the existing GNSS-Global Navigation Satellite System, comprising at present time GPS and GLONASS satellite systems.

Reference to a Satellite Positioning System or SATPS herein refers to a Global Positioning System, to a Global Orbiting Navigation System, to a GALILEO project, and to any other compatible satellite-based system that provides information by which an observer s position and the time of observation can be determined, all of which meet the requirements of the present invention.

A Satellite Positioning System (SATPS), such as the Global Positioning System (GPS) or the Global Orbiting Navigation Satellite System (GLONASS), uses transmission of coded radio signals, with the structure described above, from a plurality of Earth-orbiting satellites. A SATPS antenna receives SATPS signals from a plurality (preferably four or more) of SATPS satellites and passes these signals to an SATPS signal receiver/processor, which (1) identifies the SATPS satellite source for each SATPS signal, (2) determines the time at which each identified SATPS signal arrives at the antenna, and (3) determines the present location of the SATPS satellites.

The range ($r_i$) between the location of the i-th SATPS satellite and the SATPS receiver is equal to the speed of light c times ($\Delta t_i$), wherein ($\Delta t_i$) is the time difference between the SATPS receiver's clock and the time indicated by the satellite when it transmitted the relevant phase. However, the SATPS receiver has an inexpensive quartz clock which is not synchronized with respect to the much more stable and precise atomic clocks carried on board the satellites. Consequently, the SATPS receiver estimates a pseudo-range ($pr_i$) (not a true range) to each satellite.

After the SATPS receiver determines the coordinates of the i-th SATPS satellite by demodulating the transmitted ephemeris parameters, the SATPS receiver can obtain the solution of the set of the simultaneous equations for its unknown coordinates ($x_0$, $y_0$, $z_0$) and for unknown time bias error (cb). The SATPS receiver can also determine velocity of a moving platform.

The given below discussion, (applicable to any satellite navigational system, but focused on GPS applications to be substantially specific) can be found in "Global Positioning System: Theory and Applications", Volume II, Chapters 1 and 5, by Bradford W. Parkinson and James J. Spilker Jr., published by the American Institute of Aeronautics and Astronautics, Inc. in 1996.

Typically, GPS based positions are calculated using the World Geodetic System of 1984 (WGS84) coordinate system. These positions are expressed in Earth Centered Earth Fixed (ECEF) coordinates of X, Y, and Z axes. These positions are often transformed into latitude, longitude, and height relative to the WGS84 ellipsoid.

Differential Global Positioning System (DGPS) is a technique that significantly improves both the accuracy and the integrity of the Global Positioning System (GPS). The most common version of DGPS requires high-quality GPS "reference receivers" at known, surveyed locations. The reference station estimates the slowly varying error components of each satellite range measurement and forms a correction for each GPS satellite in view. This correction is broadcast to all DGPS users on a convenient communication link. Typical ranges for a local area differential GPS (LADGPS) station are up to 150 km. Within this operating range, the differential correction greatly improves accuracy for all users, regardless of whether selective availability (SA) is activated or is not. This improvement in the accuracy of the Global Positioning System (GPS) is possible because the largest GPS errors vary slowly with time and are strongly correlated over distance. DGPS also significantly improves the "integrity" of GPS for all classes of users, because it reduces the probability that a GPS user would suffer from an unacceptable position error attributable to an undetected system fault. Expected accuracies with DGPS are within the range from 1 to 5 meters.

Most DGPS systems use a single reference station to develop a scalar correction to the code-phase measurement. If the correction is delivered within 10 seconds, and the user is within 1000 km, the user accuracy should be between 1 and 10 meters. Users with very stringent accuracy requirements may be able to use a technique called carrier-phase DGPS or CDPGS. These users measure the phase of the GPS carrier relative to the carrier phase at a reference site; thus achieving range measurement precision that is a few percent of the carrier wavelength, typically about one centimeter. These GPS phase comparisons are used for vehicle attitude determination and also in survey applications, where the antennas are separated by tens of kilometers. If the antennas are fixed, then the survey is called static, and millimeter accuracies are possible, because long averaging times can be used to combat random noise. If the antennas are moving, then the survey is kinematic, and shorter time constants should be used with some degradation of accuracy.

Pseudolites (PLs) are ground-based transmitters that can be configured to emit GPS-like signals for enhancing the GPS by providing increased accuracy, integrity, and availability. Accuracy improvement can occur because of better local geometry, as measured by a lower vertical dilution of precision (VDOP). Availability is increased because a PL provides an additional ranging source to augment the GPS constellation.

However, a potential user of PL ranging signals should address the "near-far" problem associated with the PL signal level. One solution to the near-far problem is to configure a set of pseudolites operating within the GPS frequency bands ($L_1$: 1565–1585 MHz or $L_2$: 1217–1237 MHz) to serve a limited area with a power level low enough to preclude appreciable interference to standard GPS signals. Another solution to the near-far problem is to design the PL signal configuration to operate within $L_1$ band and mitigate or virtually eliminate the near-far issue.

The copending patent application entitled "INTEGRATED PSEUDOLITE/SATELLITE BASE STATION TRANSMITTER" by the inventor Charles R. Trimble is filed on the same date as the current patent application, is assigned to the same entity, is referred to in the current patent application as the patent application #1, and is incorporated in the current patent application in its entirety.

The patent application #1 discloses a pseudolite transmitter (PL) integrated with a satellite base station (SBS), wherein the pseudolite transmitter (PL) includes a designed signal configuration that allows a user to operate within $L_1$ band and to mitigate or virtually eliminate the near-far issue, and wherein the SBS allows to lock the timing of the pseudolite (PL) transmitter to the satellite time, and to provide an automatic determination of the location of the integrated PL/SBS transmitter.

Let us assume that a first plurality of K integrated PL/SBS transmitters owned by the first entity (in conjunction with a plurality of visible satellite signals) provides a substantially sufficient coverage of an open area A, so that a first mobile navigation/positioning receiver located in the open area A receives a substantially sufficient number of ranging signals for its navigation/positioning purposes including a plurality of K ranging signals from the network of K integrated PL/SBS transmitters, wherein K is an integer.

Let us further assume that a second entity owns a second plurality of M integrated PL/SBS transmitters and also would like to place a second mobile navigation/positioning receiver in the area B that overlaps with the area A. However, the second entity would like to use the ranging signals provided by the first plurality of K integrated PL/SBS transmitters owned by the first entity in the overlapping area of coverage before using its own plurality of M integrated PL/SBS transmitters, so that the second plurality of M integrated PL/SBS transmitters initially stays idle in order not to interfere with the first plurality of integrated PL/SBS transmitters. Thus, the second entity need not to ask or apply for license from the first entity to use its transmitters. However, if the second mobile navigation/positioning receiver navigates to the area B, wherein the ranging signals generated by the first plurality of K integrated PL/SBS transmitters do not penetrate, the second plurality of M integrated PL/SBS transmitters becomes active and provides the necessary coverage for the second mobile navigation/ positioning receiver without interfering with the signals generated by the first plurality owned by the first entity. This is a non-cooperative use by the second entity of ranging signals generated by the first entity.

What is needed is to disclose the interaction between the sub-networks of non-cooperative transmitters owned by the first and the second non-cooperative entities.

SUMMARY OF THE INVENTION

To address the shortcomings of the available art, the present invention discloses the sub-networks of non-cooperative transmitters owned by the first and the second non-cooperative entities, and methods of interaction between the sub-networks of non-cooperative transmitters owned by the first and the second non-cooperative entities.

One aspect of the present invention is directed to a network of non-cooperative integrated pseudolite (PL)/satellite base station transmitters covering an open area. In one embodiment, the network comprises: a first plurality (K) of integrated pseudolite/satellite base station $(PL)_1/(SBS)$ transmitters located in an open area A, and a second plurality (M) of non-cooperative integrated $PL_2$/SBS transmitters located in an open area B, wherein K and M are integers. Each $PL_1$ or $PL_2$ transmitter is co-located with one SBS, and has a predetermined duty cycle. At least one SBS provides a satellite timing synchronization signal. Each integrated active (transmitting) $PL_1$/SBS transmitter transmits its position location as a part of its message.

In one embodiment, the first plurality (K) of integrated $PL_1$/SBS transmitters includes a substantially sufficient number K1 of active integrated $PL_1$/SBS transmitters in order to fill out satellite shades of coverage and to substantially cover the area A so that a first mobile navigation/positioning receiver located in the area A receives a substantially sufficient number of ranging signals for its navigation/positioning purposes including K1 ranging signals from the first plurality of $PL_1$/SBS transmitters, wherein K1 is an integer less or equal to K.

In one embodiment, each integrated $PL_2$/SBS transmitter continuously detects a plurality (K2) of ranging signals transmitted by each active integrated $PL_1$/SBS transmitter. In this embodiment, each integrated $PL_2$/SBS transmitter includes a processor including an algorithm comprising at least the following logic: (a) each integrated $PL_2$/SBS transmitter does not transmit if the plurality (K2) of active integrated $PL_1$/SBS transmitters substantially covers the area B so that a second mobile navigation/positioning receiver located in the area B receives substantially sufficient number of ranging signals for its navigation/positioning purposes including K2 ranging signals from the first plurality of non-cooperative integrated $PL_1$/SBS transmitters; (b) at least a plurality (M1) of integrated $PL_2$/SBS transmitters starts transmitting, if a plurality (K3) of integrated $PL_1$/SBS transmitters does not substantially cover the open area B, so that the second mobile navigation/positioning receiver located in the area B receives substantially sufficient number of ranging signals for its navigation/positioning purposes including M1 ranging signals from the second plurality of non-cooperative $PL_2$/SBS transmitters and including K3 ranging signals from the first plurality of non-cooperative integrated $PL_1$/SBS transmitters. Herein, M1 is an integer less or equal to M, K2 is an integer less or equal to K1, and K3 is an integer less or equal to K1.

Another aspect of the present invention is directed to a network of non-cooperative pseudolite (PL) transmitters covering an in-door area comprising an area A and an area B. In one embodiment, the network comprises a first plurality (K) of pseudolite $(PL)_1$ transmitters, located in an in-door area A, and a second plurality (M) of non-cooperative pseudolite $(PL)_2$ transmitters, located in an in-door area B, wherein K and M are integers. Each pseudolite $(PL)_1$ $((PL)_2)$ transmitter is locked to a satellite time and has a predetermined duty cycle.

In one embodiment, the first plurality (K) of pseudolite $(PL)_1$ transmitters includes a substantially sufficient number K1 of active (transmitting) pseudolite $(PL)_1$ transmitters in order to substantially cover the in-door area A so that a first mobile navigation/positioning receiver located in the in-door area A receives a substantially sufficient number of ranging signals for its navigation/positioning purposes including K1 ranging signals from the first plurality of $PL_1$ transmitters, wherein K1 is an integer less or equal to K.

In one embodiment, each pseudolite $(PL)_2$ transmitter continuously detects at least one ranging signal transmitted by at least one pseudolite PL transmitter. In this embodiment, each pseudolite $(PL)_2$ transmitter includes a processor including an algorithm comprising at least the following logic: (a) the pseudolite $(PL)_2$ transmitter does not transmit if the plurality (K2) of pseudolite $(PL)_1$ transmitters substantially covers the area B so that a second mobile navigation/positioning receiver located in the area B receives substantially sufficient number of ranging signals for its navigation/positioning purposes including the K2 ranging signals from the first plurality of pseudolite $(PL)_1$ transmitters; (b) at least a plurality (M1) of pseudolite $(PL)_2$ transmitters starts transmitting, if a plurality (K3) of pseudolite $(PL)_1$ transmitters does not substantially cover the in-door area B, so that a second mobile navigation/positioning receiver located in the area B receives substantially sufficient number of ranging signals for its navigation/positioning purposes, including M1 ranging signals from the second plurality of non-cooperative pseudolite $(PL)_2$ transmitters and including K3 ranging signals from the first plurality of non-cooperative pseudolite $(PL)_1$ transmitters. Herein, K2 is an integer less or equal to K1, K3 is an integer less or equal to K1, and M1 is an integer less or equal to M.

One more aspect of the present invention is directed to a network of non-cooperative integrated pseudolite $(PL)_1$/SBS transmitters and non-cooperative pseudolite $(PL)_2$ transmitters covering an area comprising an open area A and an in-door area B.

In one embodiment, the network comprises: a first plurality (K) of integrated $(PL)_1$/SBS transmitters, located in the open area A, and a second plurality (M) of non-cooperative pseudolite $(PL)_2$ transmitters, located in an in-door area B. K is an integer, and M is an integer. Each $PL_1$ transmitter is co-located with one SBS. Each SBS provides a satellite timing synchronization signal to at least one $PL_1$ transmitter; wherein each pseudolite $(PL)_2$ transmitter is locked to a satellite time. Each $PL_1$ has a predetermined duty cycle.

In one embodiment, the first (K) plurality of integrated $(PL)_1$/SBS transmitters includes a substantially sufficient number K1 of transmitting (active) integrated $(PL)_1$/SBS transmitters in order to fill out satellite shades of coverage and to substantially cover the area A. Each integrated $(PL)_1$/SBS transmitter transmits its position location as a part of its message in order to provide the substantially sufficient number K1 of ranging signals to a first mobile navigation/positioning receiver located in the area A for its navigation/positioning purposes. K1 is an integer less or equal to K.

In one embodiment, each $(PL)_2$ transmitter continuously detects a plurality (K2) of ranging signals transmitted by a plurality (K2) of integrated $(PL)_1$/SBS transmitters. In this embodiment, each $(PL)_2$ transmitter includes a processor including an algorithm comprising at least the following logic: (a) each $(PL)_2$ transmitter does not transmit if the plurality (K2) of integrated $(PL)_1$/SBS transmitters substantially covers the area B so that a second mobile navigation/positioning receiver located in the area B receives substantially sufficient number of ranging signals K2 from the first plurality of integrated $(PL)_1$/SBS transmitters for its navigation/positioning purposes; (b) at least a plurality (M1) of $(PL)_2$ transmitters starts transmitting, if a plurality (K3) of integrated $(PL)_1$/SBS transmitters does not substantially cover the in-door area B, so that a second mobile navigation/positioning receiver located in the area B receives substantially sufficient number of ranging signals for its navigation/positioning purposes, including M1 ranging signals from the second plurality of non-cooperative $(PL)_2$ transmitters and including K3 ranging signals from the first plurality of non-cooperative integrated $(PL)_1$/SBS transmitters.

Herein, K2 is an integer less or equal to K1, K3 is an integer less or equal to K1, and M1 is an integer less or equal to M.

An additional aspect of the present invention is directed to a method for using a network of non-cooperative integrated pseudolite (PL)/satellite base station transmitters and non-cooperative pseudolite (PL) transmitters to cover an area comprising an open area A and an in-door area B. The network comprises a first plurality (K) of integrated pseudolite $(PL)_1$/SBS transmitters located in an open area A, and a second plurality (M) of non-cooperative M pseudolite $(PL)_2$ transmitters located in an in-door area B; wherein K and M are integers.

In one embodiment, the method comprises the following steps: (a) locking each $(PL)_1$ transmitter to a satellite time; (b) providing a substantially sufficient number M1 of ranging signals to a second mobile navigation/positioning receiver located in the area B for its navigation/positioning purposes; wherein each $(PL)_2$ transmitter transmits its position location as a part of its message; (c) providing a satellite timing synchronization signal to each integrated $(PL)_1$/SBS transmitter; (d) continuously detecting a plurality M2 of ranging signals transmitted by a plurality M2 of $(PL)_2$ transmitters by each integrated $(PL)_1$/SBS transmitter; (e) starting transmitting by at least K1 number of integrated $(PL)_1$/SBS transmitters, if the plurality M2 of ranging signals transmitted by the plurality M2 of $(PL)_2$ transmitters does not substantially cover the out-door area A; and (f) providing a substantially sufficient number of ranging signals to a first mobile navigation/positioning receiver located in the area A for its navigation/positioning purposes, including M2 ranging signals from the second plurality of non-cooperative $(PL)_2$ transmitters and including K1 ranging signals from the first plurality of non-cooperative integrated $(PL)_1$/SBS transmitters. M1 is an integer less or equal to M, M2 is an integer less or equal to M1, and K1 is an integer less or equal to K.

BRIEF DESCRIPTION OF THE DRAWINGS

The aforementioned advantages of the present invention as well as additional advantages thereof will be more clearly understood hereinafter as a result of a detailed description of a preferred embodiment of the invention when taken in conjunction with the following drawings.

FIG. 1 depicts a network of non-cooperative integrated pseudolite (PL)/satellite base station (SBS) transmitters covering an open area comprising an area A and an open area B.

FIG. 2 shows an integrated split-spectrum pseudolite/satellite base station (SS-PL)/SBS transmitter.

FIG. 3 is a schematic diagram showing components of a split-spectrum pseudolite (SS-PL) of FIG. 2 that is configured to transmit position determining split-spectrum signals.

FIG. 4 depicts a network of non-cooperative pseudolite (PL) transmitters covering an in-door area comprising an in-door area A and an in-door area B.

FIG. 5 shows a network comprising a first plurality (K) of integrated $(PL)_1$/SBS transmitters covering an open area A, and a second plurality (M) of non-cooperative pseudolite $(PL)_2$ transmitters located in an in-door area B.

FIG. 6 illustrates a flow chart of the method of the present invention for a non-cooperative utilization of a network of non-cooperative integrated pseudolite (PL)/SBS transmitters and non-cooperative (PL) transmitters (of FIG. 5) that covers an area comprising an open area A and an in-door area B.

FIG. 7 depicts a flow chart that details the step of providing the substantially sufficient number of ranging signals to the active first mobile navigation/positioning receiver that sends requests to the first plurality of integrated $(PL)_1$/SBS transmitters.

FIG. 8 shows a flow chart that details the step of providing the substantially sufficient number of ranging signals to the first passive mobile navigation/positioning receiver located in the open area A that does not send requests to the first plurality of integrated $(PL)_1$/SBS transmitters.

DETAILED DESCRIPTION OF THE PREFERRED AND ALTERNATIVE EMBODIMENTS.

Reference will now be made in detail to the preferred embodiments of the invention, examples of which are illustrated in the accompanying drawings. While the invention will be described in conjunction with the preferred embodiments, it will be understood that they are not intended to limit the invention to these embodiments. On the contrary, the invention is intended to cover alternatives, modifications and equivalents that may be included within the spirit and scope of the invention as defined by the appended claims. Furthermore, in the following detailed description of the present invention, numerous specific details are set forth in order to provide a thorough understanding of the present invention. However, it will be obvious to one of ordinary skill in the art that the present invention may be practiced without these specific details. In other instances, well known methods, procedures, components, and circuits have not been described in detail as not to unnecessarily obscure aspects of the present invention.

The given below discussion is applicable to any satellite navigational system, but is focused on GPS applications to be substantially specific.

FIG. 1 depicts a network 10 of non-cooperative integrated pseudolite (PL)/satellite base station (SBS) transmitters covering an open area comprising an area A 20 and an area B 22.

In one embodiment, the network 10 of non-cooperative integrated (PL)/(SBS) transmitters further comprises a first plurality (K) of integrated $(PL)_1$/(SBS) transmitters (24 26, . . . 28), located in an open area A 20. Each $PL_1$ transmitter is co-located with one SBS. In the preferred embodiment of the present invention, an integrated $(PL)_1$/(SBS) transmitter comprises an integrated split-spectrum pseudolite/satellite base station (SS-PL)/SBS transmitter disclosed in the patent application #1 that is incorporated in the current patent application in its entirety.

Following the discussion introduced in the patent application #1, FIG. 2 depicts an integrated split-spectrum pseudolite/satellite base station (SS-PL)/SBS transmitter 24. In one embodiment, the integrated (SS-PL)/SBS transmitter 24 comprises: a satellite base station (SBS) 72, and a split-spectrum pseudolite (SS-PL) transmitter (80) co-located with the (SBS) 72. The SBS further includes a satellite antenna 78 configured to receive satellite signals from a plurality of satellites 12–18. In the preferred embodiment, the SBS (72 of FIG. 2) comprises a differential Global Positioning System (DGPS) base station configured to receive the GPS satellite signals from a plurality of GPS satellites 12–18 plus the differential correction.

As was mentioned above, the differential Global Positioning System (DGPS) is a technique that significantly improves both the accuracy and the integrity of the Global Positioning System (GPS). The most common version of DGPS requires high-quality GPS "reference receivers" at known, surveyed locations. The reference station estimates the slowly varying error components of each satellite range measurement and forms a differential correction for each GPS satellite in view. This differential correction is broadcast to all DGPS users on a convenient communication link. Typical ranges for a local area differential GPS (LADGPS) station are up to 150 km. Within this operating range, the differential correction greatly improves accuracy for all users, regardless of whether selective availability (SA) is activated or is not. Expected accuracies with DGPS are within the range from 1 to 5 meters.

Users with very stringent accuracy requirements may be able to use a technique called carrier-phase DGPS or CDPGS. These users measure the phase of the GPS carrier relative to the carrier phase at a reference site; thus achieving range measurement precision that is a few percent of the carrier wavelength, typically about one centimeter. These GPS phase comparisons are used for vehicle attitude determination and also in survey applications, where the antennas are separated by tens of kilometers. If the antennas are fixed, then the survey is called static, and millimeter accuracies are possible, because long averaging times can be used to combat random noise. If the antennas are moving, then the survey is kinematic, and shorter time constants should be used with some degradation of accuracy. If the kinematic technique is used in real time, it is called a real time kinematic (RTK) GPS. The given above discussion can be found in "Global Positioning System: Theory and Applications", Volume II, Chapter 1, by Bradford W. Parkinson and James J. Spilker Jr., published by the American Institute of Aeronautics and Astronautics, Inc. in 1996.

A conventional RTK GPS system requires a clear channel for its operation. If the base station data cannot be received, the rover receiver cannot compute relative positions in real time. Problems also occur due to the distance and the available transmit power. The signal may not have sufficient power to be received, or may be attenuated if there is no clear line of sight between the base and rover. Topology or foliage may block the signal entirely, depending on the transmit frequency.

The usage of pseudolites together with a constellation of visible satellites allows to effectively expand the constellation of visible satellites. This is especially important, because in all RTK GPS applications (as it is shown below, an RTK GPS baste station is also the best mode of the present invention), one would like to have an access to at least 6 visible GPS satellites for optimum reliability of usage. Thus, having 5 pseudolites on the site allows one to tolerate even the unlikely situation of having only one visible GPS satellites in the sky view. On the other hand, having access to at least one GPS allows the RTK GPS base station to receive the GPS timing synchronization signals, which is important for the purposes of the present invention, as explained below. Thus, the main idea is to have enough ranging signals from pseudolites so as to operate RTK GPS without interruptions caused by disappearing one or more visible satellites.

The usage of the split-spectrum pseudolites (SS-PL) instead of conventional pseudolites provides also some additional benefits. Indeed, it allows to avoid interference (with the reception of the satellite signals) as well as self-interference (with the reception of the signals transmitted by other split-spectrum pseudolites (SS-PL)) by placing the greater number of other split-spectrum pseudolites (SS-PL) as compared to the number of convention pseudolites with the same duty cycle. The usage of the split-spectrum pseudolites (SS-PL) better conforms to the FAA standards by avoiding the necessity of transferring signals on top of L1(2) signals.

Referring still to FIG. 2, the RTK GPS base station 72 receives at least one GPS timing signal from a plurality of GPS satellites 12–18. Thus, the RTK GPS base station is configured to provide a timing synchronization signal to the split-spectrum pseudolite (SS-PL) transmitter 74. In the preferred embodiment of the present invention, the RTK GPS base station 72 is configured to provide a self-surveying capability for the split-spectrum pseudolite (SS-PL) 74.

In the preferred embodiment of the present invention, the RTK GPS base station 72 determines its position location (a set of positional data) in real time within a centimeter accuracy, and transmits this positional set of data to the spectrum pseudolite (SS-PL) 74 that is co-located with RTK GPS base station 72. In another embodiment of the present invention, the position of the spectrum pseudolite (SS-PL) 74 co-located with RTK GPS base station 72 is pre-surveyed. Thus, the spectrum pseudolite (SS-PL) 74 is configured to transmit its own position location as a part of the message.

In the preferred embodiment of the present invention, the spectrum pseudolite (SS-PL) transmitter 74 generates a split-spectrum sideband signal that minimizes interference with the reception of satellite signals by the RTK GPS base station, as fully disclosed in the patent application #1. If there is a plurality of integrated RTK/GPS base station/(SS-PL) transmitters located on the site, each (SS-PL) transmitter should operate within a pre-determined duty cycle (that is set during manufacturing of the (SS-PL)) in order to minimize interference of the (SS-PL) transmitted signals with the reception of the satellite signals by a satellite base station. Therefore, the number K of the integrated RTK/GPS base station/(SS-PL) transmitters that can be located on the site is dependent on the pre-determined duty cycle of the split-spectrum pseudolite (SS-PL). For example, if the pre-determined duty cycle of the split-spectrum pseudolite (SS-PL) is 10%, the maximum number K of the integrated RTK/GPS base station/(SS-PL) transmitters that can be located on the site is 10, so that there is the 100% (10% *10) utilization of the time allowed for the transmission of the split-spectrum pseudolite ranging signals that can be used for the site ranging purposes without undue interference with the reception of the satellite signals by each satellite base station (SBS).

In another embodiment of the present invention, the SBS further comprises a differential GPS base station configured to provide a GPS timing synchronization signal to the (SS-PL) pseudolite transmitter, and configured to provide the self-surveying capability for the split-spectrum pseudolite (SS-PL) with a sub-meter accuracy.

FIG. 3 is a schematic diagram (according to patent application #1) showing components of a split-spectrum pseudolite (SS-PL) (74 of FIG. 2) that is configured to transmit position determining split-spectrum signals. In the preferred embodiment of the present invention, the split-spectrum pseudolite (SS-PL) (74 of FIG. 2) is configured to transmit the L1 GPS signals. In another embodiment, the split-spectrum pseudolite (SS-PL) (74 of FIG. 2) is configured to transmit the L2 GPS signals. Yet, in one more embodiment, the split-spectrum pseudolite (SS-PL) (74 of FIG. 2) is configured to transmit the L5 GPS signals.

Referring still to FIG. 3, the split-spectrum pseudolite (SS-PL) includes controller 110 that is configured to control the operations of (SS-PL) 74. In one embodiment, the controller 110 comprises a microprocessor, multiple linked microprocessors or a general purpose computing device. In one embodiment, controller 110 includes one or more semiconductor device(s) that function as a general purpose computer. The controller (and its software) integrates all (SS-PL) functions such as satellite timing synchronization, self-surveying, pseudolite message generation, C/A code generation, P-code generation.

In one embodiment, the controller 110 includes the code generator 118 that can be an application specific integrated circuit device or one or more programs that run on a microprocessor. In another embodiment, the code generator 118 includes tapped feedback switch registers that may be used to generate a code. In one embodiment, the code is a P-code. In another embodiment, a C/A code is generated. Yet, in one more embodiment, both a P-code and a C/A code are generated. In general, any of a number of different codes, and/or combinations of codes may be used. More detailed data regarding GPS C/A codes, and P-codes is contained in GPS ICD 200 m GPS Interface Control Document, which is incorporated herein by reference.

The usage of P-codes is the best mode of the present invention because it allows to implement the integrated split-spectrum pseudolite/satellite base station (SS-PL)/RTK GPS base station transmitter having the minimum duty cycle (and, therefore, allows to place a greater number of (SS-PL)/RTK GPS base station transmitters on the working site), as compared with the utilization of C/A codes that leads to the (SS-PL)/RTK GPS base station transmitter having a longer duty cycle.

Referring still to FIG. 3, data storage device 113 is coupled to controller 110 for storing data. In one embodiment, data storage device 113 includes one or more Dynamic Random Access Memory (DRAM) device(s). In the alternative embodiment, data storage device 113 comprises one or more Static Random Access Memory (SRAM) device(s) or a flash memory device. In one embodiment, set of (SS-PL) location coordinates is stored in data storage device 113.

Continuing with FIG. 3, in one embodiment of the present invention, (SS-PL) 74 also includes: frequency synthesizer 108, baseband processor 109, reference counter and phase measurement circuitry 111, radio receiver 112 for receiving a set of GPS formatted navigational data, timing system 120, and modulator 115.

In one embodiment the modulator 115 is coupled to controller 110 for modulating the code and the (SS-PL) navigation data to produce a modulated split-spectrum sideband L1 signal. In one embodiment, modulator 115 includes two modulators (not shown) adapted to modulate data onto a carrier signal so as to produce two sideband signals.

In one embodiment, modulator 115 includes a local oscillator that operates at a frequency of 1227.6 MHz and a local oscillator that operates at a frequency of 1585.65 MHz. In this embodiment, modulator 115 modulates the P-code and GPS navigation data onto a 1227.6 MHz carrier and modulates the P-code, the C/A code and GPS navigation data onto a 1585.65 MHz carrier. This signal is then split by modulator 115 into signal at a frequency of 1575.42 MHz and signal at a frequency of 1595.88 MHz. These two sideband signals are amplified by amplifier (not shown) and are transmitted to multiplexer (not shown) that combines signals 22-24-26 and transmits the combined signal to antenna 119 (see discussion below) that radiates the combined signal. It is understood by those skillful in the art, that other signal types may be also generated by varying the data modulated onto modulator 115, and by varying the frequencies at which modulator 115 operates. Also, though the present invention is described with respect to the use of signals transmitted in the L-band, other bands could also be used.

In one embodiment, modulator 115 is configured to modulate the code and the GPS navigation data to produce a modulated split-spectrum sideband L1 signal having a peak power at frequencies at which P(Y) code has nulls. In another embodiment, modulator 115 is configured to modulate the code and the GPS navigation data to produce a modulated split-spectrum sideband L2 signal having a peak power at frequencies at which P(Y) code has nulls. Yet, in one more embodiment, modulator 115 is configured to modulate the code and the GPS navigation data to produce a modulated split-spectrum sideband L5 signal having a peak power at frequencies at which P(Y) code has nulls.

The GPS receivers utilize the cross-correlation of L1 and L2 signals for the reception purposes. Therefore, both the military and the civil use GPS receivers can determine the location of P(Y) nulls.

In one embodiment, the timing system 120 is configured to receive the GPS synchronization timing signal from the co-located GPS base station. In one embodiment, the GPS timing signal is stored in data storage device 113. In another embodiment, the timing system 120 includes one or more highly accurate time-keeping system. In one embodiment, the (SS-PL) transmitter includes a GPS receiver 117 configured to receive a GPS satellite synchronization signal and a plurality of exact GPS satellite frequencies.

Signal generator 104 provides a standard reference frequency to various other components of (SS-PL) 74. Reference counter and phase measurement circuits 111 provide phase measurement and operate as a reference counter.

In one embodiment of the present invention, controller 110 includes a code generator 118 that generates a pseudolite P-code which is delayed as compared with a GPS P-code by a delay D. In one embodiment of the present invention, the delay D is used to identify the integrated split-spectrum pseudolite/satellite base station (SS-PL)/RTK GPS base station transmitter as a (SS-PL)/RTK $GPS_D$ transmitter having the D identification number.

In one embodiment of the present invention, controller 110 includes a message generator 119 configured to generate a set of (SS-PL) data message responsive to a set of formatted GPS navigation data received by the satellite base station. In the preferred embodiment, the set of (SS-PL) data message has a substantial capacity required to support at least one GPS integrity update and at least one (SS-PL) integrity update; and has a substantial capacity required to support a set of DGPS corrections for code and carrier at a substantially high data rate. In the preferred embodiment, the set of (SS-PL) data message includes a set of the (SS-PL) positional data.

In one embodiment, the (SS-PL) 74 further includes a pseudolite antenna 119 coupled to the modulator 115 for transmitting the position determining sideband L1 split-spectrum signal. In another embodiment, the (SS-PL) 74 further includes a pseudolite antenna 119 for transmitting the position determining sideband L2 split-spectrum signal. Yet, in one more embodiment, pseudolite antenna 119 is configured to transmit the position determining sideband L5 split-spectrum. More specifically, in one embodiment, the pseudolite antenna 119 includes an L-band antenna array. In this embodiment, the sideband signals are combined using a multiplexer (not shown), and are radiated using the L-band antenna array.

Referring still to FIG. 1, the basic assumption of the present invention is that the plurality (K) of integrated $PL_1$/SBS transmitters owned by the first entity was placed first by the first entity to cover the open area A 20 so that the first mobile navigation/positioning receiver 30 located in the open area A receives a substantially sufficient number of ranging signals for its navigation/positioning purposes including K1 ranging signals from the first plurality of $PL_1$/SBS transmitters (24, 26, . . . 28). K is an integer, and K1 is an integer less or equal to K.

Thus, in the preferred embodiment of the present invention, the first plurality (K) of integrated $PL_1$/SBS transmitters (24, 26, . . . 28) includes a substantially sufficient number K1 of active integrated $PL_1$/SBS transmitters (not shown) in order to fill out satellite shades of coverage and to substantially cover the area A 20 so that a first mobile navigation/positioning receiver 30 located in the area A receives a substantially sufficient number of ranging signals for its navigation/positioning purposes including K1 ranging signals from the first plurality of $PL_1$/SBS transmitters.

In the preferred embodiment, the open area A is covered by K=$K_{MAX}$ integrated split-spectrum (SS-PL)/GPS transmitters, wherein the number $K_{MAX}$ is selected to maximize utilization of the time allowed for the transmission of the split-spectrum pseudolite ranging signals that can be used for ranging purposes without undue interference with the reception of the GPS satellite signals by each GPS satellite base station, and without undue self-interference with signals transmitted by other split-spectrum (SS-PL)/GPS transmitters.

In the preferred embodiment, the first mobile navigation/positioning receiver 30 comprises a mobile satellite base station 72 of FIG. 2 capable of receiving the satellite ranging signals from a plurality of visible satellites, and capable of receiving the pseudolite ranging signals transmitted by a plurality of split-spectrum pseudolites (SS-PL). In one embodiment, the first mobile navigation/positioning receiver 30 includes a transmitter for transmitting the radio signals.

Referring still to FIG. 1, the next assumption of the present invention is that the second entity comes second to the open area B that overlaps the open area A and places the second plurality (M) of non-cooperative integrated $PL_2$/SBS transmitters (32, 34, 36, . . . 38). M is an integer. The second plurality (M) of integrated $PL_2$/SBS transmitters (32, 34, 36, . . . 38) is called a "non-cooperative" plurality because the second entity that owns the second plurality (M) of integrated $PL_2$/SBS transmitters (32, 34, 36, . . . 38) does not cooperate with the first entity that owns the first plurality (K) of integrated $PL_1$/SBS transmitters (24, 26, . . . 28), that is, the second entity does not obtain a license to utilize the ranging signals generated by the first plurality. Instead, the second entity tries to use the ranging signals generated by the first plurality in order to operate the second mobile navigation/positioning receiver 40 located in the area B without using the ranging signals generated by the second plurality (M) of non-cooperative integrated $PL_2$/SBS transmitters (32, 34, 36, . . . 38). This approach would allow the second entity to avoid the possible interference between the second plurality of integrated $PL_2$/SBS transmitters and the first plurality of integrated $PL_1$/SBS transmitters, therefore would allow the second entity to bring the second plurality of integrated $PL_2$/SBS transmitters into the open area without asking for a license or acquiring a license from the FCC. If and when (as explained below) the second mobile rover 40 travels far enough into the area B, so that the position in which the second rover 40 finds itself becomes inaccessible by a part (or by all) of the ranging signals generated by the first plurality of integrated $PL_1$/SBS transmitters, the second plurality of integrated $PL_2$/SBS transmitters (32, 34, 36, . . . 38) becomes gradually operational so that, again, the interference between the second plurality of integrated $PL_2$/SBS transmitters and the first plurality of integrated $PL_1$/SBS transmitters is thoroughly avoided.

The same idea of operation without a license is fully applicable to the third, fourth and so on owners of the third, fourth, and so on pluralities of integrated PL/SBS transmitters that come to the same open area and would like to use the signals generated by the prior owners of equipment for operation of their respective rovers without acquiring a license(s).

Each active integrated $PL_2$/SBS transmitter transmits its position location as a part of its message. In the preferred embodiment, as depicted in FIG. 2, each $PL_2$/SBS transmitter(32, 34, 36,. . . , 38) includes a split-spectrum pseudolite (SS-PL) 74 co-located with the SBS 72. The SBS provides a satellite timing synchronization signal.

In the preferred embodiment of the present invention, in order to trigger the switch from the usage of only the first plurality of the integrated $PL_1$/SBS transmitters to the usage of the full network comprising the first plurality of the integrated $PL_1$/SBS transmitters and the second plurality of the integrated $PL_2$/SBS transmitters, the following approach is used, wherein the first plurality is gradually phased out and the second plurality is gradually phased in.

In the preferred embodiment, each integrated $PL_2$/SBS transmitter continuously detects a plurality (K2) of ranging signals transmitted by each active integrated $PL_1$/SBS transmitter, wherein K2 is an integer less or equal to K. More specifically, in the preferred embodiment, each active (that is, transmitting) integrated $PL_2$/SBS transmitter is equipped with a GPS receiver (117 of FIG. 3) configured to detect each split spectrum sideband signal generated by any active integrated $PL_1$/$GPS_{D1}$ transmitter having a delay D1 identification number and located on the site A. In one embodiment, each integrated $PL_2$/$GPS_D$ transmitter includes a processor (not shown) including an algorithm comprising at least the following logic:

(A) An integrated $PL_2$/SBS transmitter does not transmit if the plurality (K2) of active integrated $PL_1$/SBS transmitters substantially covers the open area B so that the second mobile navigation/positioning receiver 40 located in the area B receives substantially sufficient number of ranging signals for its navigation/ positioning purposes including K2 ranging signals from the first plurality of non-cooperative integrated $PL_1$/SBS transmitters.

(B) At least a plurality (M1) of integrated $PL_2$/SBS transmitters starts transmitting, if a plurality (K3) of integrated $PL_1$/SBS transmitters does not substantially cover the open area B, wherein M1 is an integer less or equal to M, and K3 is an integer less or equal to K1, so that the second mobile navigation/positioning receiver 40 located in the area B receives substantially sufficient number of ranging signals for its navigation/ positioning purposes including M1 ranging signals from the second plurality of non-cooperative $PL_2$/SBS transmitters and including K3 ranging signals from the first plurality of non-cooperative integrated $PL_1$/SBS transmitters.

In the preferred embodiment, each active (that is, transmitting) integrated $PL_2$/SBS transmitter comprises a split-spectrum $(SS-PL)_2/GPS_D$ transmitter.

In one embodiment, each SBS (72 of FIG. 2) provides a self-surveying capability for one pseudolite PL (74 of FIG. 2) that is co-located and integrated with the SBS. In an alternative embodiment, each integrated PL/SBS transmitter has been pre-surveyed, its position location has been determined and included as a part of a message of the integrated PL/SBS transmitter.

In the preferred embodiment, each SBS (72 of FIG. 2) includes a GPS satellite receiver (not shown) configured to receive at least one GPS satellite signal, and each pseudolite (PL) (74 of FIG. 2) further includes a GPS satellite receiver (117 of FIG. 3) configured to detect at least one pseudolite signal. In another embodiment, each SBS (72 of FIG. 2) includes a GLONASS satellite receiver (not shown) configured to receive at least one GLONASS satellite signal, and each pseudolite (PL) (74 of FIG. 2) further includes a GLONASS satellite receiver (117 of FIG. 3) configured to detect at least one pseudolite signal. In one more embodiment, each SBS (72 of FIG. 2) includes a GLOBAL NAVIGATION SATELLITE SYSTEM (GNSS) satellite receiver (not shown) configured to receive at least one GNSS satellite signal, and each pseudolite (PL) (74 of FIG. 2) further includes a GNSS satellite receiver (117 of FIG. 3) configured to detect at least one pseudolite signal. Yet, in one additional embodiment, each SBS (72 of FIG. 2) includes a GALILEO satellite receiver (not shown) configured to receive at least one GALILEO satellite signal, and each pseudolite (PL) (74 of FIG. 2) further includes a GALILEO satellite receiver (117 of FIG. 3) configured to detect at least one pseudolite signal.

Another aspect of the present invention, as depicted in FIG. 4, is directed to a network 140 of non-cooperative pseudolite (PL) transmitters covering an in-door area comprising an in-door area A 142 and an in-door area B 144. In one embodiment, a first plurality (K) of pseudolite $(PL)_1$ transmitters is located in an in-door area A 142, and a second plurality (M) of pseudolite $(PL)_2$ transmitters is located in an in-door area B 144, wherein K and M are integers.

As was disclosed above, pseudolites (PLs) are ground-based transmitters that can be configured to emit satellite-like signals for enhancing the SATPS by providing increased accuracy, integrity, and availability. In the preferred embodiment, pseudolites (PLs) are ground-based transmitters that can be configured to emit GPS-like signals for enhancing the GPS by providing increased accuracy, integrity, and availability. Accuracy improvement can occur because of better local geometry, as measured by a lower vertical dilution of precision (VDOP). Availability is increased because a PL provides an additional ranging source to augment the GPS constellation.

In the preferred embodiment, each pseudolite PL utilized in the network 140 comprises a split-spectrum pseudolite (SS-PL) that emits GPS-like sideband split-spectrum position determining signals. For full disclosure of a split-spectrum pseudolite (SS-PL), please see the patent application #1.

In the preferred embodiment, each pseudolite $(PL)_1$ transmitter (154, 156, ... 158) is locked to a satellite time. In one embodiment, as depicted in FIG. 4, a GPS receiver 170 (172) and a cable (not shown) coupled to the out-door GPS receiver 170 (172) provides a means for locking each pseudolite $(PL)_1$ transmitter (154, 156, ... 158) (and each pseudolite $(PL)_2$ transmitter (162, 164, ... 166)) to a GPS timing synchronization signals provided by at least one visible GPS satellite 146. In another embodiment, when an access to any visible satellite is impossible (for instance, if an in-door area is located in a deep tunnel) a precise timing signal is provided by an autonomous atomic clock 174.

Each pseudolite $(PL)_1$ transmitter has a predetermined duty cycle that determines the optimum number $K_{MAX}$ of pseudolite $(PL)_1$ transmitters that can be used simultaneously in the in-door area A 142 without undue interference. Please, see the full discussion above.

In the preferred embodiment, each split-spectrum pseudolite $(SS-PL)_1$ (154, 156, ... 158) is configured to generate a set of (SS-PL) data message that includes a set of the (SS-PL) positional data. In one embodiment, each split-spectrum pseudolite $(SS-PL)_1$ (154, 156, ... 158) further includes a pseudolite antenna (not shown) coupled to the modulator (not shown) for transmitting the position determining sideband L1 (or L2, or L5) split-spectrum signal.

Referring still to FIG. 4, and repeating the basic assumption of the present invention, the plurality (K) of pseudolite $PL_1$ transmitters owned by the first entity was placed first by the first entity to cover the in-door area A 142 so that the first mobile navigation/positioning receiver 160 located in the in-door area A receives a substantially sufficient number of ranging signals for its navigation/positioning purposes including K1 ranging signals from the first plurality of pseudolite $PL_1$ transmitters (154, 156, ... 158), wherein K is an integer, and K1 is an integer less or equal to K.

Thus, in the preferred embodiment of the present invention, the first plurality (K) of pseudolite $PL_1$ transmitters (154, 156, ... 158) includes a substantially sufficient number K1 of active pseudolite $PL_1$ transmitters (not shown) in order to substantially cover the in-door area A 142 so that a first mobile navigation/positioning receiver 160 located in the in-door area A 142 receives a substantially sufficient number of ranging signals for its navigation/ positioning purposes including K1 ranging signals from the first plurality of $PL_1$ transmitters.

In the preferred embodiment, the in-door area A 142 is covered by $K=K_{MAX}$ split-spectrum (SS-PL) pseudolite transmitters, wherein the number $K_{MAX}$ is selected to maximize utilization of the time allowed for the transmission of the split-spectrum pseudolite ranging signals that can be used for ranging purposes without undue self-interference with signals transmitted by other split-spectrum (SS-PL) pseudolite transmitters. In one embodiment, the first mobile navigation/positioning receiver 160 includes a transmitter (not shown) for transmitting the radio signals.

Referring still to FIG. 4, the next assumption of the present invention is that the second entity comes second to the in-door area B 144 that overlaps the in-door area A 142 and places the second plurality (M) of non-cooperative pseudolite $PL_2$ transmitters (162, 164, ..., 166), wherein M is an integer. The second plurality (M) of pseudolite $PL_2$ transmitters (162, 164, ..., 166) is called a "non-cooperative" plurality because the second entity that owns the second plurality (M) of pseudolite $PL_2$ transmitters (162, 164, ..., 166) does not cooperate with the first entity that owns the first plurality (K) of pseudolite $PL_1$ transmitters (154, 156, ... 158), that is, the second entity does not obtain a license to utilize the ranging signals generated by the first plurality. Instead, the second entity tries to use the ranging signals generated by the first plurality in order to operate the second mobile navigation/positioning receiver 168 located in the in-door area B 144 without using the ranging signals generated by the second plurality (M) of non-cooperative pseudolite $PL_2$ transmitters (162, 164, ..., 166). This approach would allow the second entity to avoid the possible interference between the second plurality of the (M) of non-cooperative pseudolite $PL_2$ transmitters (162, 164, ... 166) and the first plurality of pseudolite $PL_1$ transmitters (154, 156, ... 158), therefore would allow the second entity to bring the second plurality of pseudolite $PL_2$ transmitters into the in-door area without asking for a license from the first entity, or acquiring a license from the FCC.

If and when (as explained below) the second mobile rover 168 travels far enough into the in-door area B 144, so that the position in which the second rover 168 finds itself becomes unaccessible by part or all of the ranging signals generated by the first plurality of pseudolite $PL_1$ transmitters (154, 156,... 158), the second plurality of $PL_2$ transmitters (162, 164, ..., 166) becomes gradually operational so that, again, the interference between the second plurality of $PL_2$ transmitters and the first plurality of $PL_1$ transmitters is thoroughly avoided.

The same idea of operation without a license is fully applicable to the third, fourth and so on owners of the third, fourth, and so on pluralities of pseudolite PL transmitters that come to the same in-door area and would like to use the signals generated by the prior owners of equipment for operation of their respective rovers without asking for a license(s), or acquiring a license(s) from the FCC.

In one embodiment, the first plurality (K) of pseudolite $(PL)_1$ transmitters includes a substantially sufficient number K1 of active (transmitting) pseudolite $(PL)_1$ transmitters (154, 156, ... 158) in order to substantially cover the in-door area A 142. In one embodiment, each $PL_1$ has been pre-surveyed, its position location has been determined and included as a part of its message. In another embodiment, each $(PL)_1$ transmitter comprises a stationary $(PL)_1$ pre-surveyed transmitter, and the first mobile navigation/positioning receiver 160 located in the in-door area A includes a memory (not shown) including a database including a set of position coordinates for each $PL_1$ transmitter.

In one embodiment, the first mobile navigation/positioning receiver 160 located in the in-door area A receives a substantially sufficient number of ranging signals for its navigation/positioning purposes including K1 ranging signals from the first plurality of $PL_1$ transmitters (154, 156, ... 158), wherein K is an integer, and K1 is an integer less or equal to K.

In one embodiment, each $PL_2$ has been pre-surveyed, its position location has been determined and included as a part of its message. In another embodiment, each $(PL)_2$ transmitter comprises a stationary pre-surveyed $(PL)_2$ transmitter, each $(PL)_1$ transmitter comprises a stationary pre-surveyed $(PL)_1$ transmitter, and the second mobile navigation/positioning receiver 168 located in the in-door area B 144 includes a memory (not shown) including a database including a set of position coordinates for each $(PL)_2$ transmitter and for each $(PL)_1$ transmitter.

In the preferred embodiment of the present invention, in order to trigger the switch from the usage of only the first plurality of the $PL_1$ transmitters to the usage of the full network (140 of FIG. 4) comprising the first plurality of the $PL_1$ transmitters and the second plurality of the $PL_2$ transmitters, the following approach is used, wherein the first plurality is gradually phased out and the second plurality is gradually phased in: each pseudolite $(PL)_2$ transmitter continuously detects at least one ranging signal transmitted by at least one pseudolite $(PL)_1$ transmitter. In the preferred embodiment, each pseudolite $(PL)_2$ transmitter further includes a GPS receiver configured to detect at least one pseudolite signal.

In one embodiment, each $PL_2$ transmitter includes a processor (not shown) including an algorithm comprising at least the following logic:

(A) The pseudolite $(PL)_2$ transmitter does not transmit if the plurality (K2) of pseudolite $(PL)_1$ transmitters substantially covers the in-door area B 144 so that the second mobile navigation/positioning receiver 168 located in the in-door area B receives substantially sufficient number of ranging signals for its navigation/positioning purposes including the K2 ranging signals from the first plurality of pseudolite $(PL)_1$ transmitters.

(B) At least a plurality (M1) of pseudolite $(PL)_2$ transmitters starts transmitting, if a plurality (K3) of pseudolite $(PL)_1$ transmitters does not substantially cover the in-door area B, so that a second mobile navigation/positioning receiver 168 located in the in-door area B receives substantially sufficient number of ranging signals for its navigation/positioning purposes, including M1 ranging signals from the second plurality of non-cooperative pseudolite $(PL)_2$ transmitters and including K3 ranging signals from the first plurality of non-cooperative pseudolite $(PL)_1$ transmitters.

In the preferred embodiment, M is an integer, M1 is an integer less or equal to M, K2 is an integer less or equal to K1, and K3 is an integer less or equal to K1. In the preferred embodiment, each $PL_2$ transmitter (162, 164, ... 166) includes a split-spectrum pseudolite (SS-PL).

Another aspect of the present invention, as shown in FIG. 5, is directed to a network 180 comprising a first plurality (K) of integrated $(PL)_1$/SBS transmitters (194, 196, 198, ... 200) covering an open area A 182, and a second plurality (M) of non-cooperative pseudolite $(PL)_2$ transmitters (202, 204, 206, ... 208) located in an in-door area B 184, wherein K and M are integers.

As was fully disclosed above, each $PL_1$ transmitter is co-located with one SBS. Each SBS provides a satellite timing synchronization signal. Each $PL_1$ has a predetermined duty cycle.

In one embodiment, the first (K) plurality of integrated $(PL)_1$/SBS transmitters (194, 196, 198, ... 200) includes a substantially sufficient number K1 of transmitting (active) integrated $(PL)_1$/SBS transmitters (not shown) in order to fill out satellite shades of coverage, to substantially cover the open area A 182, and to provide a substantially sufficient number K1 of ranging signals to a first mobile navigation/positioning receiver 210 located in the open area A 182 for its navigation/positioning purposes. Herein, K1 is an integer less or equal to K.

In one embodiment, each pseudolite $(PL)_2$ transmitter (202, 204, 206, ... 208) is locked to a satellite time by using a satellite receiver 214 and a cable (not shown). In another embodiment, each pseudolite $(PL)_2$ transmitter (202, 204, 206, ... 208) is locked to a satellite precise time by using an atomic clock 216.

The above given reasoning is fully applicable to the network 180 of FIG. 5. That is, repeating the basic assumption of the present invention, the first (K) plurality of integrated $(PL)_1$/SBS transmitters (194, 196, 198, ... 200) owned by the first entity was placed first by the first entity to cover the in-door area A 182 so that the first mobile navigation/positioning receiver 210 located in the in-door area A receives a substantially sufficient number of ranging signals for its navigation/positioning purposes including K1 ranging signals from the first plurality of integrated $(PL)_1$/SBS transmitters (194, 196, 198, ... 200), wherein K is an integer, and K1 is an integer less or equal to K.

In the preferred embodiment, the open area A 182 is covered by K=$K_{MAX}$ integrated split-spectrum (SS-PL)/SBS transmitters, wherein the number $K_{MAX}$ is selected to maximize utilization of the time allowed for the transmission of the split-spectrum pseudolite ranging signals that can be used for ranging purposes without undue interference with the satellite signals, and without undue self-interference with signals transmitted by other integrated split-spectrum (SS-PL)/SBS transmitters. In one embodiment, the first mobile navigation/positioning receiver 210 includes a transmitter (not shown) for transmitting the radio signals.

Referring still to FIG. 5, the next assumption of the present invention is that the second entity comes second to the in-door area B 184 that overlaps the open area A 182 and places the second plurality (M) of non-cooperative pseudolite $PL_2$ transmitters (202, 204, 206, ... 208), wherein M is an integer. The second plurality (M) of pseudolite $PL_2$ transmitters (202, 204, 206, ... 208) is called a "non-cooperative" plurality because the second entity that owns the second plurality (M) of pseudolite $PL_2$ transmitters (202, 204, 206, ... 208) does not cooperate with the first entity that owns the first plurality (K) of integrated $(PL)_1$/SBS transmitters (194, 196, 198, ... 200). That is, the second entity does not obtain a license to utilize the ranging signals generated by the first plurality. Instead, the second entity tries to use the ranging signals generated by the first plurality in order to operate the second mobile navigation/positioning receiver 212 located in the in-door area B 184 without using the ranging signals generated by the second plurality (M) of non-cooperative pseudolite $PL_2$ transmitters (202, 204, 206, ... 208).

This approach would allow the second entity to avoid the possible interference between the second plurality of the (M) of non-cooperative pseudolite $PL_2$ transmitters (202, 204, 206, ... 208) and the first plurality (K) of integrated $(PL)_1$/SBS transmitters (194, 196, 198, ... 200), and therefore would allow the second entity to bring the second plurality of pseudolite $PL_2$ transmitters into the in-door area without asking for a license or acquiring a license from the FCC.

If and when (as explained below) the second mobile rover 212 travels far enough into the in-door area B 184, so that the position in which the second rover 212 finds itself becomes unaccessible by part or all of the ranging signals generated by the first plurality (K) of integrated $(PL)_1$/SBS transmitters (194, 196, 198, ... 200), the second plurality of $PL_2$ transmitters (202, 204, 206, ... 208) becomes gradually operational so that, again, the interference between the second plurality of $PL_2$ transmitters and the first plurality of integrated $(PL)_1$/SBS transmitters is thoroughly avoided.

The same idea of operation without a license is fully applicable to the third, fourth and so on owners of the third, fourth, and so on pluralities of pseudolite PL transmitters that come to the same in-door area B and would like to use the signals generated by the prior owners of equipment for operation of their respective rovers.

In one embodiment, each $(PL)_2$ transmitter (using a GPS receiver) continuously detects a plurality (K2) of ranging signals transmitted by a plurality (K2) of integrated $(PL)_1$/SBS transmitters.

In one embodiment, each $(PL)_2$ transmitter includes a processor (not shown) including an algorithm comprising at least the following logic:

(A) Each $(PL)_2$ transmitter does not transmit if the plurality (K2) of integrated $(PL)_1$/SBS transmitters substantially covers the in-door area B 184 so that the second mobile navigation/positioning receiver 212 located in the area B 184 receives substantially sufficient number of ranging signals K2 from the first plurality of integrated $(PL)_1$/SBS transmitters for its navigation/positioning purposes. (B) At least a plurality (M1) of $(PL)_2$ transmitters starts transmitting, if a plurality (K3) of integrated $(PL)_1$/SBS transmitters does not substantially cover the in-door area B 184 so that the second mobile navigation/positioning receiver 212 located in the area B 184 receives substantially sufficient number of ranging signals for its navigation/positioning purposes, including M1 ranging signals from the second plurality of non-cooperative $(PL)_2$ transmitters and including K3 ranging signals from the first plurality of non-cooperative integrated $(PL)_1$/SBS transmitters.

In the preferred embodiment, K3 is an integer less or equal to K1, K2 is an integer less or equal to K1, and M1 is an integer less or equal to M.

One more aspect of the present invention is directed, as illustrated in the flow chart 220 of FIG. 6, to the method of the present invention for a non-cooperative utilization of a network of non-cooperative integrated pseudolite (PL)/SBS transmitters and non-cooperative (PL) transmitters (180 of FIG. 5) that covers an area comprising an open area A 182 and an in-door area B 184. In one embodiment, the network comprises a first plurality (K) of integrated pseudolite $(PL)_1$/SBS transmitters located in an open area A and a second plurality (M) of non-cooperative M pseudolite $(PL)_2$ transmitters located in an in-door area B (as depicted in FIG. 5), wherein K and M are integers.

Now, in the preferred embodiment, the assumption is reversed, so that the second entity comes first to the in-door area B 184 that overlaps the open area A 182 and places the second plurality (M) of pseudolite $PL_2$ transmitters (202, 204, 206, ... 208), wherein M is an integer. Now the first (K) plurality of integrated $(PL)_1$/SBS transmitters (194, 196, 198, ... 200) owned by the first entity was placed second by the first entity to cover the in-door area A 182. Thus, the assumption is that the first (K) plurality of integrated $(PL)_1$/SBS transmitters (194, 196, 198, ... 200) owned by the first entity is a "non-cooperative" plurality because the first entity does not want to obtain the license from the second entity. Instead, the first entity tries to use the ranging signals generated by the second plurality in order to operate the first mobile navigation/positioning receiver 210 located in the open area A 182 without using the ranging signals generated by the first plurality (K) of non-cooperative integrated $(PL)_1$/SBS transmitters (194, 196, 198, ... 200).

If and when the first mobile rover 210 travels far enough into the open area A 182, so that the position in which the second rover 210 finds itself becomes unaccessible by part or all of the ranging signals generated by the second plurality (M) of $(PL)_2$ transmitters (202, 204, 206, ... 208), the first (K) plurality of non-cooperative integrated $(PL)_1$/SBS transmitters (194, 196, 198, ... 200) becomes gradually operational so that, again, the interference between the second plurality of $PL_2$ transmitters and the first plurality of integrated $(PL)_1$/SBS transmitters is thoroughly avoided.

Referring still to FIG. 6, after locking each $(PL)_2$ transmitter to a satellite time (step 224), a substantially sufficient number M1 of ranging signals is provided to the second mobile navigation/positioning receiver 212 located in the in-door area B 184 for its navigation/positioning purposes. The assumption also is, as explained above, that the first mobile navigation/positioning receiver 210 located in the open area 182 also receives a substantially sufficient number M1 of ranging signals from the second (M) plurality of $(PL)_2$ transmitters (202, 204, 206, . . . 208) for its navigation/positioning purposes.

To gradually phase in the first (K) plurality of non-cooperative integrated $(PL)_1$/SBS transmitters (194, 196, 198, . . . 200), a satellite timing synchronization signal to each integrated $(PL)_1$/SBS transmitter is provided (step 228). Next (step 230), each integrated $(PL)_1$/SBS transmitter continuously detects a plurality M2 of ranging signals transmitted by a plurality M2 of $(PL)_2$ transmitters.

If the first rover 210 moves so far away inside the out-door area A (the test 236) so that it can not receive the substantially sufficient plurality M2 of ranging signals transmitted by the plurality M2 of $(PL)_2$ transmitters for its navigation/positioning purposes, at least K1 number of integrated $(PL)_1$/SBS transmitters starts transmitting (step 232) without undue interference with the second plurality.

Finally (step 242), a substantially sufficient number of ranging signals is provided without undue interference to a first mobile navigation/positioning receiver 210 located far inside in the area A for its navigation/positioning purposes, including M2 ranging signals from the second plurality of non-cooperative $(PL)_2$ transmitters and including K1 ranging signals from the first plurality of non-cooperative integrated $(PL)_1$/SBS transmitters.

In one embodiment of the present invention the first mobile navigation/positioning receiver 210 includes a satellite transceiver and active. In this embodiment, FIG. 7 depicts a flow chart that details the step of providing the substantially sufficient number of ranging signals to the first mobile navigation/positioning receiver that communicates with the first plurality of integrated $(PL)_1$/SBS transmitters and requests the gradual phase in.

After detecting a first request-to-turn-in signal from the first mobile navigation/positioning receiver moved in the area A (step 262), a first integrated $(PL)^1_1$/SBS transmitter from the first plurality of K integrated $(PL)_1$/SBS transmitters is turned in. If the signal transmitted by this first integrated $(PL)^1_1$/SBS transmitter and received by the first rover 210 is not enough for the rover's navigation/positioning purposes, the rover sends a next request to turn in the next integrated $(PL)^2_1$/SBS transmitter. After detecting the second request-to-turn-in signal from the first mobile navigation/positioning receiver 210 located in the area A (step 266), if the first mobile navigation/positioning receiver 210 is still lacking a sufficient number of ranging signals including the plurality of available satellite signals, including the plurality (M2) of ranging signals from the first plurality of non-cooperative $(PL)_2$ transmitters, and including a pseudolite signal from the first integrated $(PL)^1_1$/SBS transmitter for its navigation/positioning purposes (test condition 274), the second integrated $(PL)^2_1$/SBS transmitter from the first plurality of K integrated $(PL)_1$/SBS transmitters is turned in (step 268).

The steps (266–270) are preferably repeated until the first mobile navigation/positioning receiver 210 receives a substantially sufficient number of ranging signals for its navigation/positioning purposes including the K1 number of ranging signals from the first plurality of integrated $(PL)_1$/SBS transmitters.

In another embodiment, FIG. 8 shows a flow chart that details the step of providing the substantially sufficient number of ranging signals to the first passive mobile navigation/positioning receiver 210 located in the open area A 182 that does not send requests to the first plurality of integrated $(PL)_1$/SBS transmitters.

After turning in a first integrated $(PL)^1_1$/SBS transmitter from the first plurality of K integrated $(PL)_1$/SBS transmitters (step 306), and after continuously detecting a number of transmitting $(PL)_1$ transmitters from the second (M) plurality of $(PL)_2$ transmitters (step 308), if the number of transmitting $(PL)_2$ transmitters from the second (M) plurality of $(PL)_1$ transmitters is less than M1 (test condition 314), a second integrated $(PL)^2_1$/SBS transmitter from the first plurality of K integrated $(PL)_1$/SBS transmitters is turned in (step 310).

Steps (308–310) are preferably repeated until the number of transmitting $(PL)_1$ transmitters from the second (M) plurality of $(PL)_2$ transmitters becomes equal to M1. Steps (308–310) are preferably resumed if at least one transmitting $(PL)_2$ transmitter from the second (M) plurality of $(PL)_2$ transmitters stops transmitting.

The foregoing description of specific embodiments of the present invention have been presented for purposes of illustration and description. They are not intended to be exhaustive or to limit the invention to the precise forms disclosed, and obviously many modifications and variations are possible in light of the above teaching. The embodiments were chosen and described in order to best explain the principles of the invention and its practical application, to thereby enable others skilled in the art to best utilize the invention and various embodiments with various modifications as are suited to the particular use contemplated. It is intended that the scope of the invention be defined by the claims appended hereto and their equivalents.

What is claimed is:

1. A network of non-cooperative integrated pseudolite (PL)/satellite base station transmitters covering an open area, said network comprising:

a first plurality (K) of integrated pseudolite/satellite base station $(PL)_1$/(SBS) transmitters, K being an integer, located in an open area A, each said $PL_1$ transmitter being co-located with one said SBS; wherein each said SBS provides a satellite timing synchronization signal; and wherein each said PL has a predetermined duty cycle; and wherein each said integrated active/transmitting $PL_1$/SBS transmitter transmits its position location as a part of its message; and wherein said first plurality (K) of integrated $PL_1$/SBS transmitters includes a substantially sufficient number K1 of active integrated $PL_1$/SBS transmitters in order to fill out satellite shades of coverage and to substantially cover said area A so that a first mobile navigation/positioning receiver located in said area A receives a substantially sufficient number of ranging signals for its navigation/positioning purposes including K1 ranging signals from said first plurality of $PL_1$/SBS transmitters; K1 being an integer less or equal to K; and a second plurality (M) of non-cooperative integrated $PL_2$/SBS transmitters, M being an integer, located in an open area B, each said $PL_2$ transmitter being co-located with one said SBS; wherein each said SBS provides a satellite timing synchronization signal; wherein each said active integrated PL$_2$/SBS transmitter transmits its position location as a part of its message; wherein each said integrated PL$_2$/SBS transmitter continuously detects a plurality (K2) of ranging signals transmitted by each said active integrated PL$_1$/SBS transmitter; K2 being an integer less or equal to K1; each said integrated PL$_2$/SBS transmitter includes a processor including an algorithm comprising at least the following logic:

each said integrated PL$_2$/SBS transmitter does not transmit if said plurality (K2) of active integrated PL$_1$/SBS transmitters substantially covers said area B so that a second mobile navigation/positioning receiver located in said area B receives substantially sufficient number of ranging signals for its navigation/positioning purposes including K2 ranging signals from said first plurality of non-cooperative integrated PL$_1$/SBS transmitters;

at least a plurality (M1) of integrated PL$_2$/SBS transmitters starts transmitting, M1 being an integer less or equal to M, if a plurality (K3) of integrated PL$_1$/SBS transmitters does not substantially cover said open area B, K3 being an integer less or equal to K1, so that said second mobile navigation/positioning receiver located in said area B receives substantially sufficient number of ranging signals for its navigation/positioning purposes including M1 ranging signals from said second plurality of non-cooperative PL$_2$/SBS transmitters and including K3 ranging signals from said first plurality of non-cooperative integrated PL$_1$/SBS transmitters.

2. The network of non-cooperative integrated PL/SBS transmitters of claim 1, wherein each said SBS provides a self-surveying capability for one said pseudolite PL that is co-located and integrated with said SBS.

3. The network of non-cooperative integrated PL/SBS transmitters of claim 1, wherein each said integrated PL/SBS transmitter has been pre-surveyed, its position location has been determined and included as a part of a message of said integrated PL/SBS transmitter.

4. The network of non-cooperative integrated pseudolite (PL)/satellite base station transmitters of claim 1, wherein each said integrated PL/SBS transmitter further includes:

a satellite receiver configured to detect at least one signal transmitted by said network of non-cooperative integrated PL/SBS transmitters.

5. The network of non-cooperative integrated pseudolite (PL)/satellite base station transmitters of claim 1, wherein each said integrated PL/SBS transmitter further includes:

a split-spectrum pseudolite (SS-PL) configured to generate a split-spectrum sideband signal that minimizes interference with the reception of at least one satellite signal.

6. The network of non-cooperative integrated pseudolite (PL)/satellite base station transmitters of claim 1;

wherein each said satellite base station includes:

a GPS satellite receiver configured to receive at least one GPS satellite signal;

and wherein each said pseudolite (PL) further includes:

a GPS satellite receiver configured to detect at least one pseudolite signal.

7. The network of non-cooperative integrated pseudolite (PL)/satellite base station transmitters of claim 1;

wherein each said satellite base station includes:

a GLONASS satellite receiver configured to receive at least one GLONASS satellite signal;

and wherein each said pseudolite (PL) includes:

a GLONASS satellite receiver configured to detect at least one pseudolite signal.

8. The network of non-cooperative integrated pseudolite (PL)/satellite base station transmitters of claim 1;

wherein each said satellite base station includes:

a GLOBAL NAVIGATION SATELLITE SYSTEM (GNSS) satellite receiver configured to receive at least one GNSS satellite signal;

and wherein each said pseudolite (PL) includes:

a GNSS satellite receiver configured to detect at least one pseudolite signal.

9. The network of non-cooperative integrated pseudolite (PL)/satellite base station transmitters of claim 1;

wherein each said satellite base station includes:

a GALILEO satellite receiver configured to receive at least one GALILEO satellite signal;

and wherein each said pseudolite (PL) includes:

a GALILEO satellite receiver configured to detect at least one pseudolite signal.

10. The network of non-cooperative integrated pseudolite (PL)/satellite base station transmitters of claim 1;

wherein each said satellite base station includes:

a combined GPS/GALILEO satellite receiver configured to receive at least one GALILEO satellite signal and at least one GPS satellite signal;

and wherein each said pseudolite (PL) includes:

a combined GPS/GALILEO satellite receiver configured to detect at least one pseudolite signal.

11. A network of non-cooperative pseudolite (PL) transmitters covering an in-door area, said network comprising:

a first plurality (K) of pseudolite (PL)$_1$ transmitters, K being an integer, located in an in-door area A, wherein each said pseudolite (PL)$_1$ transmitter is locked to a satellite time; wherein each said pseudolite (PL)$_1$ transmitter has a predetermined duty cycle;

wherein said first plurality (K) of pseudolite (PL)$_1$ transmitters includes a substantially sufficient number K1 of active/transmitting pseudolite (PL)$_1$ transmitters in order to substantially cover said in-door area A so that a first mobile navigation/positioning receiver located in said in-door area A receives a substantially sufficient number of ranging signals for its navigation/positioning purposes including K1 ranging signals from said first plurality of PL$_1$ transmitters; K1 being an integer less or equal to K; and a second plurality (M) of non-cooperative pseudolite (PL)$_2$ transmitters, M being an integer, located in an in-door area B; wherein each said pseudolite (PL)$_2$ transmitter is locked to a satellite time; and wherein each said pseudolite (PL)$_2$ transmitter continuously detects at least one ranging signal transmitted by at least one pseudolite PL transmitter; each said pseudolite (PL)$_2$ transmitter includes a processor including an algorithm comprising at least the following logic:

said pseudolite (PL)$_2$ transmitter does not transmit if said plurality (K2) of pseudolite (PL)$_1$ transmitters substantially covers said area B so that a second mobile navigation/positioning receiver located in said area B receives substantially sufficient number of ranging signals for its navigation/positioning purposes including said K2 ranging signals from said first plurality of pseudolite (PL)$_1$ transmitters; K2 being an integer less or equal to K1;

at least a plurality (M1) of pseudolite (PL)$_2$ transmitters starts transmitting, M1 being an integer less or equal to M, if a plurality (K3) of pseudolite $(PL)_1$ transmitters does not substantially cover said in-door area B, K3 being an integer less or equal to K1, so that a second mobile navigation/positioning receiver located in said area B receives substantially sufficient number of ranging signals for its navigation/positioning purposes, including M1 ranging signals from said second plurality of non-cooperative pseudolite $(PL)_2$ transmitters and including K3 ranging signals from said first plurality of non-cooperative pseudolite $(PL)_1$ transmitters.

12. The network of non-cooperative pseudolite (PL) transmitters covering an in-door area of claim 11, wherein each said $(PL)_2$ transmitter comprises a stationary $(PL)_2$ transmitter, and wherein each said $(PL)_1$ transmitter comprises a stationary $(PL)_1$ transmitter, and wherein said second mobile navigation/positioning receiver located in said area B includes a memory including a database including a set of position coordinates for each said $(PL)_2$ transmitter and for each said $(PL)_1$ transmitter, and wherein said first mobile navigation/positioning receiver located in said in-door area A includes a memory including a database including a set of position coordinates for each said $PL_1$ transmitter.

13. The network of non-cooperative pseudolite (PL) transmitters covering an in-door area of claim 11, wherein each said $(PL)_2$ transmitter is pre-surveyed, and wherein each said $(PL)_1$ transmitter is pre-surveyed.

14. The network of non-cooperative pseudolite (PL) transmitters covering an in-door area of claim 11,
   wherein each said pseudolite $(PL)_1$ transmitter further includes:
       a means for receiving a GPS satellite synchronization signal and for receiving a plurality of exact GPS satellite frequencies; and
       a means for detecting at least one pseudolite signal;
   and wherein each said pseudolite $(PL)_1$ transmitter further includes:
       a means for receiving a GPS satellite synchronization signal and for receiving a plurality of exact GPS satellite frequencies; and
       a means for detecting at least one pseudolite signal.

15. The network of non-cooperative pseudolite (PL) transmitters covering an in-door area of claim 14, wherein said means for receiving a GPS satellite synchronization signal and for receiving a plurality of exact GPS satellite frequencies further includes:
   a cable coupled to an out-door GPS receiver.

16. The network of non-cooperative pseudolite (PL) transmitters covering an in-door area of claim 14, wherein said means for detecting at least one pseudolite signal further includes:
   a GPS receiver.

17. A network of non-cooperative integrated pseudolite $(PL)_1$/SBS transmitters and non-cooperative pseudolite $(PL)_2$ transmitters covering an area comprising an open area A and an in-door area B, said network comprising:
   a first plurality (K) of integrated $(PL)_1$/SBS transmitters, K being an integer, located in said open area A, each said $PL_1$ transmitter being co-located with one said SBS; wherein each said SBS provides a satellite timing synchronization signal; wherein each said $PL_1$ has a predetermined duty cycle; wherein said first (K) plurality of integrated $(PL)_1$/SBS transmitters includes a substantially sufficient number K1 of transmitting/active integrated $(PL)_1$/SBS transmitters in order to fill out satellite shades of coverage and to substantially cover said area A, and wherein each said integrated $(PL)_1$/SBS transmitter transmits its position location as a part of its message in order to provide said substantially sufficient number K1 of ranging signals to a first mobile navigation/positioning receiver located in said area A for its navigation/positioning purposes; K1 being an integer less or equal to K; and
   a second plurality (M) of non-cooperative pseudolite $(PL)_2$ transmitters, M being an integer, located in an in-door area B, wherein each said pseudolite $(PL)_2$ transmitter is locked to a satellite time;
   wherein each said $(PL)_2$ transmitter continuously detects a plurality (K2) of ranging signals transmitted by a plurality (K2) of integrated $(PL)_1$/SBS transmitters; each said $(PL)_2$ transmitter includes a processor including an algorithm comprising at least the following logic:
       each said $(PL)_2$ transmitter does not transmit if said plurality (K2) of integrated $(PL)_1$/SBS transmitters substantially covers said area B so that a second mobile navigation/positioning receiver located in said area B receives substantially sufficient number of ranging signals K2 from said first plurality of integrated $(PL)_1$/SBS transmitters for its navigation/positioning purposes; K2 being an integer less or equal to K1;
       at least a plurality (M1) of $(PL)_2$ transmitters starts transmitting, M1 being an integer less or equal to M, if a plurality (K3) of integrated $(PL)_1$/SBS transmitters does not substantially cover said in-door area B, K3 being an integer less or equal to K1; so that a second mobile navigation/positioning receiver located in said area B receives substantially sufficient number of ranging signals for its navigation/positioning purposes, including M1 ranging signals from said second plurality of non-cooperative $(PL)_2$ transmitters and including K3 ranging signals from said first plurality of non-cooperative integrated (PL)$_1$/SBS transmitters.

18. The network of non-cooperative integrated $(PL)_1$/SBS transmitters and non-cooperative $(PL)_2$ transmitters of claim 17, wherein each said $(PL)_2$ transmitter further includes:
   a means for receiving a GPS satellite synchronization signal and for receiving a plurality of exact GPS satellite frequencies; and
   a means for detecting at least one pseudolite signal.

19. The network of non-cooperative integrated $(PL)_1$/SBS transmitters and non-cooperative $(PL)_2$ transmitters of claim 18, wherein said means for receiving said GPS satellite synchronization signal and for receiving said plurality of exact GPS satellite frequencies further includes:
   a cable coupled to an out-door GPS receiver.

20. The network of non-cooperative integrated $(PL)_1$/SBS transmitters and non-cooperative $(PL)_2$ transmitters of claim 16, wherein said means for detecting said at least one pseudolite signal further includes:
   a GPS receiver.

21. A method for using a network of non-cooperative integrated pseudolite (PL)/satellite base station transmitters and non-cooperative pseudolite (PL) transmitters to cover an area comprising an open area A and an in-door area B, said network comprising a first plurality (K) of integrated pseudolite $(PL)_1$/SBS transmitters located in an open area A and a second plurality (M) of non-cooperative M pseudolite $(PL)_2$ transmitters located in an in-door area B; K being an integer; M being an integer, said method comprising the steps of:

locking each said $(PL)_2$ transmitter to a satellite time;

providing a substantially sufficient number M1 of ranging signals to a second mobile navigation/positioning receiver located in said area B for its navigation/positioning purposes; M1 being an integer less or equal to M; wherein each said $(PL)_2$ transmitter transmits its position location as a part of its message;

providing a satellite timing synchronization signal to each said integrated $(PL)_1$/SBS transmitter;

continuously detecting a plurality M2 of ranging signals transmitted by a plurality M2 of $(PL)_2$ transmitters by each said integrated $(PL)_1$/SBS transmitter; M2 being an integer less or equal to M1;

starting transmitting by at least K1 number of integrated $(PL)_1$/SBS transmitters, K1 being an integer less or equal to K, if said plurality M2 of ranging signals transmitted by said plurality M2 of $(PL)_2$ transmitters does not substantially cover said out-door area A; and providing a substantially sufficient number of ranging signals to a first mobile navigation/positioning receiver located in said area A for its navigation/positioning purposes, including M2 ranging signals from said second plurality of non-cooperative $(PL)_2$ transmitters and including K1 ranging signals from said first plurality of non-cooperative integrated $(PL)_1$/SBS transmitters.

22. The method of claim 21, wherein said step of providing said substantially sufficient number of ranging signals to said first mobile navigation/positioning receiver located in said area A for its navigation/positioning purposes further includes the steps of:

(A) detecting a first request-to-turn-in signal from said first mobile navigation/positioning receiver moved in said area A, said first mobile navigation/positioning receiver including a SBS including a satellite transceiver;

(B) turning on a first integrated $(PL)^1_1$/SBS transmitter from said first plurality of K integrated $(PL)_1$/SBS transmitters;

(C) detecting a second request-to-turn-in signal from said first mobile navigation/positioning receiver located in said area A, if said second mobile navigation/positioning receiver is lacking a sufficient number of ranging signals including said plurality of available satellite signals, including said plurality (M2) of ranging signals from said first plurality of non-cooperative $(PL)_2$ transmitters, and including a pseudolite signal from said first integrated $(PL)^1_1$/SBS transmitter for its navigation/positioning purposes;

(D) turning on a second integrated $(PL)^2_1$/SBS transmitter from said first plurality of K integrated $(PL)_1$/SBS transmitters; and (E) repeating said steps (C–D) until said first mobile navigation/positioning receiver receives a substantially sufficient number of ranging signals for its navigation/positioning purposes including said K1 number of ranging signals from said first plurality of integrated $(PL)_1$/SBS transmitters.

23. The method of claim 21, wherein said step of providing said substantially sufficient number of ranging signals to said first mobile navigation/positioning receiver located in said area A for its navigation/positioning purposes further includes the steps of:

(A) turning on a first integrated $(PL)^1_1$/SBS transmitter from said first plurality of K integrated $(PL)_1$/SBS transmitters;

(B) continuously detecting a number of transmitting $(PL)_1$ transmitters from said second (M) plurality of $(PL)_2$ transmitters;

(C) if said number of transmitting $(PL)_2$ transmitters from said second (M) plurality of $(PL)_1$ transmitters is less than M1, turning on a second integrated $(PL)^2_1$/SBS transmitter from said first plurality of K integrated $(PL)_1$/SBS transmitters; and (D) repeating said steps (B–C) until said number of transmitting $(PL)_1$ transmitters from said second (M) plurality of $(PL)_2$ transmitters becomes equal to M1.

24. The method of claim 23, wherein said step (D) of repeating said steps (B–C) further includes the step of:

resuming said steps (B–C) if at least one said transmitting $(PL)_2$ transmitter from said second (M) plurality of $(PL)_2$ transmitters stops transmitting.

25. The method of claim 21 further including the step of:

providing by each said SBS a self-surveying capability for one said pseudolite PL that is co-located and integrated with said SBS.

26. The method of claim 21 further including the steps of:

pre-surveying each said PL transmitter;

determining its position location; and including said position location as a part of a message of said PL transmitter.

27. The method of claim 21, further including the steps of:

pre-surveying each said PL transmitter;

determining its position location; and pre-programming said second rover with the position locations of each said PL transmitter.

28. A method for utilizing by a first plurality (M) of non-cooperative pseudolite $(PL)_1$ transmitters a plurality of signals transmitted by a second plurality (K) of integrated pseudolite $(PL)_2$/SBS transmitters; said first plurality (M) of non-cooperative pseudolite $(PL)_1$ transmitters being located in an in-door area A; said second plurality (K) of integrated pseudolite $(PL)_2$/SBS transmitters being located in an open area B; M being an integer; K being an integer; said method comprising the steps of:

providing a satellite timing synchronization signal to each said integrated $(PL)_2$/SBS transmitter;

continuously detecting a plurality K1 of ranging signals transmitted by a plurality K1 of said integrated $(PL)_2$/SBS transmitters; K1 being an integer less or equal to K; and providing a substantially sufficient number of ranging signals to a first mobile navigation/positioning receiver located in said in-door area A for its navigation/positioning purposes, including said K1 ranging signals from said plurality K1 of said integrated $(PL)_2$/SBS transmitters.

29. The method of claim 28 further including the step of:

providing by each said SBS a self-surveying capability for one said pseudolite PL that is co-located and integrated with said SBS.

30. The method of claim 28 further including the steps of:

pre-surveying each said integrated $(PL)_2$/SBS transmitter;

determining its position location; and including said position location as a part of a message of said integrated $(PL)_2$/SBS transmitter.

31. A method for utilizing by a first plurality (M) of non-cooperative integrated pseudolite $(PL)_1$/SBS transmitters a plurality of signals transmitted by a second plurality (K) of integrated pseudolite $(PL)_2$/SBS transmitters; said first plurality (M) of non-cooperative integrated pseudolite $(PL)_1$/SBS transmitters being located in an open area A; said second plurality (K) of integrated pseudolite $(PL)_2$/SBS transmitters being located in an open area B; M being an integer; K being an integer; said method comprising the steps of:

provide a satellite timing synchronization signal to each said integrated $(PL)_2$/SBS transmitter;

continuously detecting a plurality K1 of ranging signals transmitted by a plurality K1 of said integrated $(PL)_2$/SBS transmitters; K1 being an integer less or equal to K; and providing a substantially sufficient number of ranging signals to a first mobile navigation/positioning receiver located in said open area A for its navigation/positioning purposes, including said K1 ranging signals from said plurality K1 of said integrated $(PL)_2$/SBS transmitters.

32. The method of claim 31 further including the step of:

providing by each said SBS a self-surveying capability for one said pseudolite PL that is co-located and integrated with said SBS.

33. The method of claim 31 further including the steps of:

pre-surveying each said integrated $(PL)_2$/SBS transmitter;

determining its position location; and including said position location as a part of a message of said integrated $(PL)_2$/SBS transmitter.

34. A network of non-cooperative integrated pseudolite (PL)/satellite base station transmitters covering an open area, said network comprising:

a first integrated (PL)/SBS transmitting means covering an open area A; and a second integrated (PL)/SBS transmitting means covering an open area B;

wherein each said PL transmitter is co-located with one said SBS; and wherein each said SBS provides a satellite timing synchronization signal; and wherein each said active integrated PL/SBS transmitting means transmits its position location as a part of its message;

wherein a first mobile navigation/positioning receiver located in said open area A receives a substantially sufficient number of ranging signals including a plurality of ranging signals generated by said first integrated (PL)/SBS transmitting means;

and wherein a second mobile navigation/positioning receiver located in said open area B receives a substantially sufficient number of ranging signals including a plurality of ranging signals generated by said first integrated (PL)/SBS transmitting means and including a plurality of ranging signals generated by said second integrated (PL)/SBS transmitting means;

and wherein each said second integrated PL/SBS transmitting means continuously detects a plurality of ranging signals transmitted by each said first active integrated PL/SBS transmitting means in order to optimize a number of second integrated PL/SBS transmitting means in said area B.

35. A network of non-cooperative integrated pseudolite (PL)/satellite base station transmitters and pseudolite (PL) transmitters covering an area comprising an open area A and an in-door area B, said network comprising:

a first integrated (PL)/SBS transmitting means covering said open area A; and a second (PL) transmitting means covering said in-door area B;

wherein each said integrated PL transmitter is co-located with one said SBS; and wherein each said SBS provides a satellite timing synchronization signal;

and wherein each said (PL) transmitting means is locked to a satellite time; and wherein each said active integrated PL/SBS transmitting means transmits its position location as a part of its message; and wherein each said PL transmitting means transmits its position location as a part of its message;

wherein a second mobile navigation/positioning receiver located in said in-door area B receives a substantially sufficient number of ranging signals including a plurality of ranging signals generated by said second (PL) transmitting means;

and wherein a first mobile navigation/positioning receiver located in said open area A receives a substantially sufficient number of ranging signals including a plurality of ranging signals generated by said second (PL) transmitting means and including a plurality of ranging signals generated by said first integrated (PL)/SBS transmitting means;

and wherein each said first integrated PL/SBS transmitting means continuously detects a plurality of ranging signals transmitted by each said second PL transmitting means in order to optimize a number of first integrated PL/SBS transmitting means in said open area A.

* * * * *